US007333998B2

(12) United States Patent
Heckerman et al.

(10) Patent No.: US 7,333,998 B2
(45) Date of Patent: Feb. 19, 2008

(54) APPARATUS AND ACCOMPANYING METHODS FOR VISUALIZING CLUSTERS OF DATA AND HIERARCHICAL CLUSTER CLASSIFICATIONS

(75) Inventors: David E. Heckerman, Bellevue, WA (US); Paul S. Bradley, Seattle, WA (US); David M. Chickering, Bellevue, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/808,064

(22) Filed: Mar. 24, 2004

(65) Prior Publication Data

US 2004/0181554 A1    Sep. 16, 2004

Related U.S. Application Data

(63) Continuation of application No. 09/845,151, filed on Apr. 30, 2001, now Pat. No. 6,742,003, which is a continuation-in-part of application No. 09/104,751, filed on Jun. 25, 1998, now Pat. No. 6,216,134.

(51) Int. Cl.
  *G06F 17/30* (2006.01)
(52) U.S. Cl. .................. 707/101; 707/6; 707/104.1
(58) Field of Classification Search .............. 707/3, 707/4, 5, 10, 103 R, 104.1, 6, 7, 101, 102; 701/200, 202, 206, 208; 704/9, 103, 522, 704/202, 206; 705/5, 10, 23; 706/2; 709/201, 709/203, 218, 219; 711/157, 173; 713/200; 345/347
See application file for complete search history.

(56) References Cited

U.S. PATENT DOCUMENTS 4,903,305 A    2/1990    Gillick et al.
(Continued)

FOREIGN PATENT DOCUMENTS

WO    WO 90/04231    *    4/1990
(Continued)

OTHER PUBLICATIONS

Cliff Brunk, et al., MineSet: An Integrated System for Data Mining, Data Mining and Visualization, AAAI Press, 1997.
(Continued)

*Primary Examiner*—Shahid A Alam
(74) *Attorney, Agent, or Firm*—Amin, Turocy & Calvin, LLP

(57) ABSTRACT

A system that incorporates an interactive graphical user interface for visualizing clusters (categories) and segments (summarized clusters) of data. Specifically, the system automatically categorizes incoming case data into clusters, summarizes those clusters into segments, determines similarity measures for the segments, scores the selected segments through the similarity measures, and then forms and visually depicts hierarchical organizations of those selected clusters. The system also automatically and dynamically reduces, as necessary, a depth of the hierarchical organization, through elimination of unnecessary hierarchical levels and inter-nodal links, based on similarity measures of segments or segment groups. Attribute/value data that tends to meaningfully characterize each segment is also scored, rank ordered based on normalized scores, and then graphically displayed. The system permits a user to browse through the hierarchy, and, to readily comprehend segment inter-relationships, selectively expand and contract the displayed hierarchy, as desired, as well as to compare two selected segments or segment groups together and graphically display the results of that comparison. An alternative discriminant-based cluster scoring technique is also presented.

15 Claims, 29 Drawing Sheets

U.S. PATENT DOCUMENTS

| | | |
|---|---|---|
| 5,506,986 A | 4/1996 | Healy |
| 5,537,586 A | 7/1996 | Amram et al. |
| 5,742,816 A | 4/1998 | Barr et al. |
| 5,758,072 A | 5/1998 | Filepp et al. |
| 5,768,578 A | 6/1998 | Kirk et al. |
| 5,787,414 A | 7/1998 | Mike et al. |
| 5,832,484 A | 11/1998 | Sankaran et al. |
| 5,835,905 A | 11/1998 | Pirolli et al. |
| 5,850,516 A | 12/1998 | Schneier |
| 5,856,928 A | 1/1999 | Yan |
| 5,873,099 A | 2/1999 | Hogan et al. |
| 5,903,892 A | 5/1999 | Hoffert et al. |
| 5,911,139 A | 6/1999 | Jain et al. |
| 5,913,205 A | 6/1999 | Jain et al. |
| 5,915,250 A | 6/1999 | Jain et al. |
| 5,920,873 A | 7/1999 | Van Huben et al. |
| 5,953,725 A | 9/1999 | Eprahim et al. |
| 5,963,948 A * | 10/1999 | Shilcrat ............ 707/100 |
| 5,970,421 A | 10/1999 | Ostrovsky |
| 5,991,756 A | 11/1999 | Wu |
| 6,006,230 A | 12/1999 | Ludwig et al. |
| 6,038,559 A | 3/2000 | Ashby et al. |
| 6,088,717 A | 7/2000 | Reed et al. |
| 6,094,654 A | 7/2000 | Van Huben et al. |
| 6,134,541 A | 10/2000 | Castelli et al. |
| 6,374,367 B1 | 4/2002 | Dean et al. |

FOREIGN PATENT DOCUMENTS

| | | |
|---|---|---|
| WO | WO 95/31788 | 11/1995 |
| WO | WO 95/34884 | 12/1995 |
| WO | WO 96/28787 | 9/1996 |

OTHER PUBLICATIONS

Cheeseman, et al., Bayesian Classification AutoClass: Theory and Results, Advances in Knowledge Discovery and Data Mining, AAAI Press, 1995.

David M. Chickering, et al., A Bayesian Approach to Learning Bayesian Networks with Local Structure [Web Page] 1997; http://www.lis.pitt.edu/~dsl/UA197/Chickering.UA197.html[Accessed Jun. 17, 1998].

Richard O. Duda, et al., Pattern Classification and Scene Analysis, John Wiley and Sons, London, 1973, Chapters 2,4-6, pp. 10-43 and 85-260.

David E. Heckerman, Probabilistic Similarity Networks, MIT Press, 1990, Chapter 3, Theory of Similarity Networks, pp. 53-103.

Richard A. Johnson, et al., Applied Multivariate Statistical Analysis, Prentice-Hall, Inc., Englewood Cliffs, New Jersey, 1982, Chapter 11, Clustering, pp. 532-560.

Edie Rasmussen, Clustering Algorithms, in William B. Frakes and Ricardo Baeza-Yates (eds.) Information Retrieval: Data Structures and Algorithms, Prentice-Hall, Englewood Cliffs, New Jersey, 1992, pp. 419-442.

Ross D. Schachter, et al., Simulation Approaches to General Probabilistic Interface on Belief Networks, in Max Herrion et al. (eds.) Uncertainty to Artificial Intelligence 5, Elsevier Science Publishers B.V., North Holland, 1990, pp. 221-231.

David J. Spiegelhalter, et al., Satistical and Knowledge-based Approaches to Clinical Decision-support Systems, with an Application in Gastroenterology, Journal of the Royal Statistical Society, 147:35-77, 1984.

Semio Corporation, [Alta Vista Site] 1998; http://www.semio.com.

* cited by examiner

| Record | Att1 | Att2 | Att3 | Att4 | ... | Att M-1 | Att M |
|---|---|---|---|---|---|---|---|
| 1 | 1 | 0 | 1 | 34 | | 10 | 0 |
| 2 | 1 | 0 | 1 | 36 | | 11 | 0 |
| 3 | 0 | 1 | 0 | 10 | | 11 | 1 |
| ... | | | | | | | |
| N-1 | 0 | 1 | 0 | 9 | | 11 | 1 |
| N | 1 | 0 | 0 | 30 | | 10 | 0 |

FIG. 1A

| Record | Att1 | Att2 | Att3 | Att4 | ... | Att M-1 | Att M | CLASS |
|---|---|---|---|---|---|---|---|---|
| 1 | 1 | 0 | 1 | 34 | | 10 | 0 | A |
| 2 | 1 | 0 | 1 | 36 | | 11 | 0 | B |
| 3 | 0 | 1 | 0 | 10 | | 11 | 1 | C |
| ... | | | | | | | | |
| N-1 | 0 | 1 | 0 | 9 | | 11 | 1 | C |
| N | 1 | 0 | 0 | 30 | | 10 | 0 | A |

| Record | Att1 | Att2 | Att3 | Att4 | ... | Att M-1 | Att M | CLASS |
|---|---|---|---|---|---|---|---|---|
| 1 | 1 | 0 | 1 | 34 | | 10 | 0 | A |
| 2 | 1 | 0 | 1 | 36 | | 11 | 0 | B |
| 3 | 0 | 1 | 0 | 10 | | 11 | 1 | C |
| ... | | | | | | | | |
| N-1 | 0 | 1 | 0 | 9 | | 11 | 1 | C |
| N | 1 | 0 | 0 | 30 | | 10 | 0 | A |
| N+1 | 1 | 0 | 1 | 35 | | 11 | 0 | B |

| Record | Att1 | Att2 | Att3 | Att4 | ... | Att M-1 | Att M | CLUSTER |
|---|---|---|---|---|---|---|---|---|
| 1 | 1 | 0 | 1 | 34 | | 10 | 0 | A |
| 2 | 1 | 0 | 1 | 36 | | 11 | 0 | A |
| 3 | 0 | 1 | 0 | 10 | | 11 | 1 | B |
| ... | | | | | | | | |
| N-1 | 0 | 1 | 0 | 9 | | 11 | 1 | B |
| N | 1 | 0 | 0 | 30 | | 10 | 0 | A |

FIG. 1D

APPARATUS AND ACCOMPANYING METHODS FOR VISUALIZING CLUSTERS OF DATA AND HIERARCHICAL CLUSTER CLASSIFICATIONS

CROSS-REFERENCE TO RELATED APPLICATIONS

This application is a continuation of U.S. patent application Ser. No. 09/845,151, filed on Apr. 30, 2001, and entitled "APPARATUS AND ACCOMPANYING METHODS FOR VISUALIZING CLUSTERS OF DATA AND HIERARCHICAL CLUSTER CLASSIFICATIONS," which is a continuation-in-part of co-pending U.S. patent application Ser. No. 09/104,751, filed on Jun. 25, 1998, and entitled "METHOD AND SYSTEM FOR VISUALIZATION OF CLUSTERS AND CLASSIFICATIONS". The entireties of these applications are incorporated herein by reference.

BACKGROUND OF THE DISCLOSURE

1. Field of the Invention

The invention relates to a system that incorporates an interactive graphical user interface for graphically visualizing clusters (specifically segments) of data. Specifically, the system automatically categorizes incoming case data into clusters, summarizes those clusters into segments, determines similarity measures for those particular segments and then forms and visually depicts hierarchical organizations of those segments. The system also compares two user-selected segments or segment groups together and graphically displays normalized scored comparison results. Additionally, the system also automatically and dynamically reduces, as necessary, a depth of the hierarchical organization (total number of hierarchical levels) based on scored similarity measures of the selected clusters; and, based on normalized scores, provides and displays a relative ranking of the displayed segments, as well as displays summarized characteristics of any such segment.

2. Description of the Prior Art

Computer systems have long been used for data analysis. For example, data may include demographics of users and web pages accessed by those users. A web master (i.e., a manager of a web site) may desire to review web page access patterns of those users in order to optimize links between various web pages or to customize advertisements to the demographics of the users. However, it may be very difficult for the web master to analyze the access patterns of thousands of users involving possibly hundreds of web pages. However, this difficulty may be lessened if the users can be categorized by common demographics and common web page access patterns. Two techniques of data categorization—classification and clustering—can be useful when analyzing large amounts of such data. These categorization techniques are used to categorize data represented as a collection of records, each containing values for various attributes. For example, each record may represent a user, and the attributes describe various characteristics of that user. The characteristics may include the sex, income, and age of the user, or web pages accessed by the user. FIG. 1A illustrates a collection of records organized as a table. Each record (1, 2, ..., n) contains a value for each of the attributes (1, 2, ..., m). For example, attribute 4 may represent the age of a user and attribute 3 may indicate whether that user has accessed a certain web page. Therefore, the user represented by record 2 accessed the web page as represented by attribute 3 and is age 36 as represented by attribute 4. Each record, together with all its attributes, is commonly referred to as a "case".

Classification techniques allow a data analyst (e.g., web master) to group the records of a collection (dataset or population) into classes. That is, the data analyst reviews the attributes of each record, identifies classes, and then assigns each record to a class. FIG. 1B illustrates the results of classifying a collection. The data analyst has identified three classes: A, B, and C. In this example, records 1 and n have been assigned to class A; record 2 has been assigned to class B, and records 3 and n−1 have been assigned to class C. Thus, the data analyst determined that the attributes for rows 1 and n are similar enough to be in the same class. In this example, a record can only be in one class. However, certain records may have attributes that are similar to more than one class. Therefore, some classification techniques, and more generally some categorization techniques, assign a probability that each record is in each class. For example, record 1 may have a probability of 0.75 of being in class A, a probability of 0.1 of being in class B, and a probability of 0.15 of being in class C. Once the data analyst has classified the records, standard classification techniques can be applied to create a classification rule that can be used to automatically classify new records as they are added to the collection. (see, e.g., R. Duda et al, *Pattern Classification and Scene Analysis* (© 1973, John Wiley and Sons) (hereinafter the "Duda et al" textbook) which is incorporated by reference herein)). FIG. 1C illustrates the automatic classification of record n+1 when it is added to the collection. In this example, the new record was automatically assigned to class B.

Clustering techniques provide an automated process for analyzing the records of the collection and identifying clusters of records that have similar attributes. For example, a data analyst may request a clustering system to cluster the records into five clusters. The clustering system would then identify which records are most similar. and place them into one of the five clusters. (See, e.g., the Duda et al textbook) Also, some clustering systems automatically determine the number of clusters. FIG. 1D illustrates the results of the clustering of a collection. In this example, records 1, 2, and n have been assigned to cluster A, and records 3 and n−1 have been assigned to cluster B. Note that in this example the values stored in the column marked "cluster" in FIG. 1D have been determined by the clustering algorithm.

Once the categories (e.g., classes and clusters) are established, the data analyst can use the attributes of the categories to guide decisions. For example, if one category represents users who are mostly teenagers, then a web master may decide to include advertisements directed to teenagers in the web pages that are accessed by users in this category. However, the web master may not want to include advertisements directed to teenagers on a certain web page if users in a different category who are senior citizens who also happen to access that web page frequently. Even though the categorization of the collection may reduce the amount of data from thousands of records, a data analyst still needs to review possibly 10 or 20 categories. The data analyst still needs to understand the similarity and dissimilarity of the records in the categories so that appropriate decisions can be made.

Currently, the Internet is revolutionizing commerce by providing a relatively low cost platform for vendors and a very convenient platform for consumers through which consumers, in the form of Internet users, and vendors can engage in commerce. Not only are certain vendors merely appearing through a so-called web presence, but existing traditional, so-called "bricks and mortar", retail establishments are augmenting their sales mechanisms through implementation of electronic commerce web sites. To facilitate this commerce, various computer software manufacturers have developed and now have commercially available software packages which can be used to quickly implement and deploy, and easily operate a fully-functional electronic commerce web site. One such package is a "Commerce Server" software system available from the Microsoft Corporation of Redmond, Washington (which is also the present assignee hereof). In essence and to the extent relevant, the "Commerce Server" system provides a very comprehensive, scalable processing infrastructure through which customized business-to-consumer and business-to-business electronic commerce web sites can be quickly implemented. This infrastructure, implemented on typically a web server computer, provides user profiling, product cataloguing and content management, transaction processing, targeted marketing and merchandizing functionality, and analysis of consumer buying activities.

With the rapid and burgeoning deployment of electronic commerce web sites, web site owners have realized that voluminous consumer data gathered and provided through such a site, and particularly its electronic commerce server, provides a wealth of useful information. Through this information, on-line consumer buying patterns can be discerned and targeted advertising, even to the point of directed targeted advertising to a particular individual based on that person's particular buying habits and/or interests, can be rendered which, in turn, generally yields significantly higher response rates and improved user experiences over that resulting from traditional mass media advertising and at significantly lower costs to the vendor.

Yet, a practical difficulty has arisen. While categories (also known as classes) can be readily and automatically extracted from data, such as on-line consumer transaction data, through well-known conventional clustering techniques such as the "EM" algorithm, it has proven to be rather difficult to present category data in a simple meaningful and easily understood manner to a business manager who is making marketing or other decisions based on that data. Generally, in the past, category data was simply provided as textual lists, that typically listed a number of consumers in each category and an associated probabilistic or other numeric measure (collectively "metrics") associated with each user and each category. These users and categories could then be compared against each other through assessing their metrics to discern trends or other information of interest.

However, textual data, particularly if it is voluminous, which is very often the case with consumer purchasing data, is extremely tedious for an analyst to quickly comprehend (i.e., "digest") particularly when looking for trends or other relationships that are "hidden" in the data. Furthermore, while conventional clustering techniques, such as the "EM" algorithm, are rather effective in clustering the data, based on discerned relationships amongst different cases in the data (a case being a single record with all its associated attribute data, as discussed above), often times the resulting clusters are simply mathematical constructs in a flat list. The resulting clusters provide little, if any and often no, physically discernible basis in reality, i.e., the qualitative meaning and physical distinctions (apart from differences in mathematical metrics) between different clusters are unclear, if not very difficult, to comprehend. In essence, the question of "What do the clusters represent?" can become very difficult for the data analyst to answer. Hence, useful distinctions effectively become lost in the results, thus frustrating not only a data analyst who is then working with that data but also ultimately a business manager who, in an effort to reduce business risk, may need to make costly marketing and sales decisions, such as how to effectively market a given product and to whom and when, based on that data.

Given the difficulty associated with assessing text-based clustering results, various techniques have been developed in the art for visualizing clustered data, and particularly its classifications, in an attempt to facilitate and aid, e.g., the analyst or business manager in extracting useful relationships from the data.

One technique that exists in the art is described in published International patent application WO 90/04321 to S. R. Barber et al (published on Apr. 19, 1990). This technique relies on dynamically classifying data into non-exclusive pre-defined categories with those categories then being displayed as leaves in a semantic network. While this technique is certainly useful, it is not applicable to situations where the categories are not known beforehand—as often occurs with consumer data.

A basic need of any such visualization system is to provide cluster information in a manner that allows its viewer to readily appreciate essential differences between the cases in a cluster, i.e., those distinctions that characterize the data.

Thusfar, the visualization tools available in the art for depicting clusters and their inter-relationships have proven to be quite deficient in practice in meeting this need, particularly, though certainly not exclusively, when utilized in an electronic commerce setting.

In that regard, a visualization tool needs to automatically cluster data without prior knowledge of categories, i.e., the tool must discern the categories from the data itself.

Furthermore, data relationships are often far more complex than those depicted through a two-level network. Often, categories form parts of multi-level hierarchies, with the qualitative basis for those relationships only appearing evident when all or most of the hierarchy is finally extracted from the data and exposed. Furthermore, as noted, hierarchical distinctions, that are often quite granular, are the product of mathematical clustering techniques and from a qualitative standpoint, may be essentially meaningless; hence, necessitating a need to dynamically reduce a depth of the hierarchy to eliminate these distinctions and thus provide meaningful visual results to, e.g., the data analyst and business manager.

Moreover, to enhance understanding of what individual clusters mean and their inter-relationships, a user of the visualization system should also be able to readily browse through a hierarchy of displayed clusters, and, if desired, select individual clusters for comparison with each other—where, to facilitate browsing, the displayed clusters are organized based on their similarity to each other. That user should also be able to expand or contract the displayed hierarchy, as desired, to enhance understanding the relationships that exist amongst the various clusters. In that regard, these clusters should also be scored, through similarity metrics, and ranked accordingly, with the results being visually displayed in a meaningful graphical manner. Summarized data for each cluster should also be meaningfully displayed.

Thus, the present invention is directed at providing an interactive cluster visualization tool which properly addresses and satisfies these heretofore unfilled needs in the art. Such a tool is particularly, though certainly not exclusively, suited for use in servers designed to support electronic commerce.

SUMMARY OF THE INVENTION

Advantageously, the present invention overcomes the deficiencies associated with cluster visualization systems known in the art.

In accordance with the inventive teachings, one embodiment of the present invention provides a cluster (category) visualization ("CV") system that, given a set of incoming data records, automatically determines proper categories for those records, without prior knowledge of any such categories; clusters the records accordingly into those categories; and thereafter presents a graphic display of the categories of a collection of those records referred to as "category graph." The CV system may optionally display the category graph as a "similarity graph" or a "hierarchical map." When displaying a category graph, the CV system displays a graphic representation of each category. The CV system displays the category graph as a similarity graph or a hierarchical map in a way that visually illustrates the similarity between categories. The display of a category graph allows a data analyst to better understand the similarity and dissimilarity between categories. A similarity graph includes a node for each category and an arc connecting nodes representing categories whose similarity is above a threshold. A hierarchical map is a tree structure that includes a node for each base category along with nodes representing combinations of similar categories.

The CV system calculates and displays various characteristic and discriminating information about the categories. In particular, the CV system displays information describing the attributes of a category that best discriminate the records of that category from another category. The CV system also displays information describing the attributes that are most characteristic of a category.

A second and increasingly sophisticated embodiment of the present invention not only provides automatic category determination and record clustering and display, but also provides a visualization tool that, for summarized cluster data in the form of segments, calculates similarity measures therebetween, and, based on those measures, forms and graphically depicts multi-level hierarchical organizations of those segments. The system also compares two user-selected segments or segment groups together and graphically displays normalized scored comparison results, and by so doing, readily enhances and facilitates user understanding of inter-relationships among a data population represented by the clusters.

Furthermore, since some clustering distinctions, which are the product of mathematical clustering techniques, may be rather granular from a quantitative perspective but essentially meaningless, from a qualitative standpoint, this embodiment automatically and dynamically changes the hierarchy, based on similarity measures, to eliminate these distinctions, by reducing, where appropriate, the number of hierarchical levels and inter-nodal links. By doing so, this embodiment provides meaningful results in a visual fashion that facilitates user discovery and understanding of inter-relationships then existing in the data population.

In addition, to further enhance user understanding of these inter-relationships, this second embodiment also permits a user to readily browse through the hierarchy of displayed segments, and expand or contract the hierarchy, as desired, to further expose the relationships amongst the various segments. In that regard, the displayed segments are scored, through similarity metrics with the results being visually displayed. Attribute/value data that tends to meaningfully characterize each segment is also scored, rank ordered based on normalized scores and then graphically displayed.

In accordance with a feature of the present invention, segments and segment groups can be scored, based on their similarity, through various different alternate techniques, with one such technique being discriminant-based. Advantageously, this particular technique statistically balances the similarity measure between two segments or segment groups with the strength of its support, i.e., amount of the underlying evidence (e.g., number of records (event observations) in each segment or segment group).

BRIEF DESCRIPTION OF THE DRAWINGS

The teachings of the present invention can be readily understood by considering the following detailed description in conjunction with the accompanying drawings, in which:

FIG. 1A depicts a collection of records as a table;

FIG. 1B depicts results of the classification of the collection shown in FIG. 1A;

FIG. 1C depicts automatic classification of a record when it is added to the collection shown in FIG. 1A;

FIG. 1D depicts results of the clustering of the collection shown in FIG. 1A;

To facilitate understanding, identical reference numerals have been used, where possible, to designate identical elements that are common to multiple figures.

DETAILED DESCRIPTION OF THE INVENTION

Figure 2A:
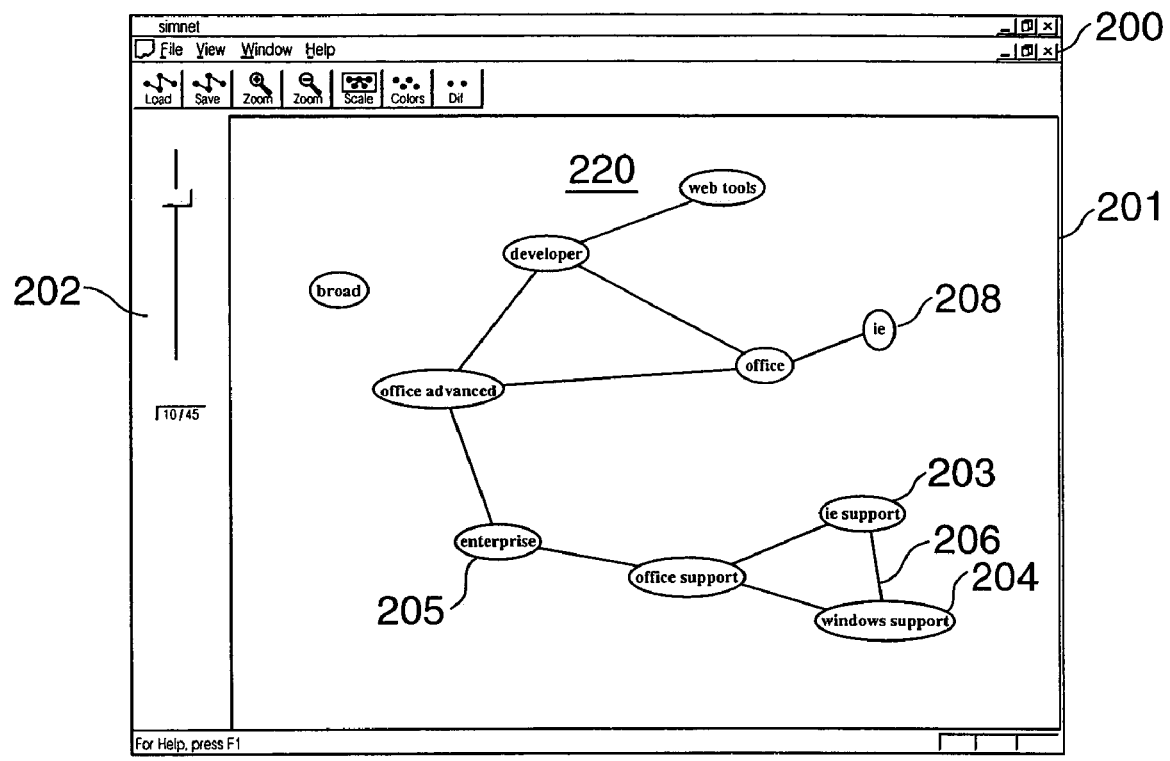
FIGS. 2A-2F collectively depict illustrative displays of a similarity network.

The present invention provides a category visualization ("CV") system that presents a graphic display of the categories of a collection of records referred to as "category graph." The CV system may optionally display the category graph as a "similarity graph" or a "hierarchical map." When displaying a category graph, the CV system displays a graphic representation of each category. The CV system displays the category graph as a similarity graph or a hierarchical map in a way that visually illustrates the similarity between categories. The display of a category graph allows, e.g., a data analyst to better understand the similarity and dissimilarity between categories.

A similarity graph includes a node for each category and an arc connecting nodes representing categories that are similar. The CV system, in a first one of its embodiments, allows the data analyst to select a similarity threshold and then displays arcs between nodes representing pairs of categories whose similarity is above the similarity threshold. Similarity is a rating of how similar the records of one category are to the records of another category. A mathematical basis for similarity is provided below. As the data analyst changes the similarity threshold, the CV system adds and removes arcs between the nodes based on the decrease or increase of the similarity threshold. The CV system-also allows the data analyst to combine categories that are most similar and to split a combined category into its subcategories. The CV system updates the display of the similarity graph to reflect the combining and splitting of categories.

A hierarchical map includes a node for each base category along with nodes representing combinations of similar categories. A base category is a category identified by a categorization process (e.g., classification and clustering), whereas a combined category has been assigned the records of two or more base categories. A leaf node representing each base category forms the bottom of the hierarchy, and a root node representing a category that contains all the records in the collection (population or dataset) forms the top of the hierarchy. Each non-leaf node represents a combined category. Each non-leaf node has two arcs that connect the non-leaf node to the two nodes representing the subcategories of the combined categories represented by the non-leaf node. To form the hierarchy, the CV system starts with the base categories and combines the two base categories that are most similar to form a combined category. The CV system then combines the two categories (including combined categories, but not including any category that has already been combined) that are most similar. The CV system repeats this process until one combined category represents all the records in the collection.

The CV system allows a data analyst to interact with a category graph to obtain further information relating to the categories. In response to a data analyst selecting a displayed graphic representation, the CV system displays additional information about the represented category. For example, the CV system may display the number of records in the category or characteristic attributes of the category. In response to a data analyst selecting a displayed arc, the CV system displays information relating to the categories connected by the arc. For example, if the data analyst selects an arc in a similarity network, then the CV system may display the similarity value for the two categories represented by the nodes that the selected arc connects. The CV system also allows the user to de-emphasize (e.g., hide) the nodes representing certain categories so that data analysts may focus their attention on the other non-de-emphasized categories.

Although a mathematical basis for similarity is provided below in detail, similarity can be defined in many different ways. Conceptually, similarity refers to a rating of the differences between the attribute values of the records in one category and the attribute values of the records in another category. A high value for similarity indicates that there is little difference between the records in the two categories.

FIGS. 2A-2F illustrate example displays of a similarity network. The similarity network illustrates the similarity between ten categories, which have been named based on web page access attributes. Table 1 below lists names of the categories and numbers of records in each category.

TABLE 1

| Category Name | Number of Records |
|---|---|
| broad | 18 |
| web tools | 15789 |
| developer | 6632 |
| advanced office | 3868 |
| office | 12085 |
| ie | 22621 |
| enterprise | 10162 |
| office support | 9516 |
| ie support | 6687 |
| windows support | 12618 |

Window 200 contains a display area 201 and a slider 202. The similarity network 220 within the display area contains a node for each category and an arc for each pair of categories whose similarity is above the similarity threshold. For example, node 203 representing category "ie support" and node 204 representing category "windows support" have a similarity that is above the similarity threshold and are thus connected by arc 206. However, the similarity between category "ie support" and category "enterprise" is below the similarity threshold. Therefore, the similarity network has no arc between node 205 representing category "enterprise" and node 203 representing category "ie support."

Figure 2B:
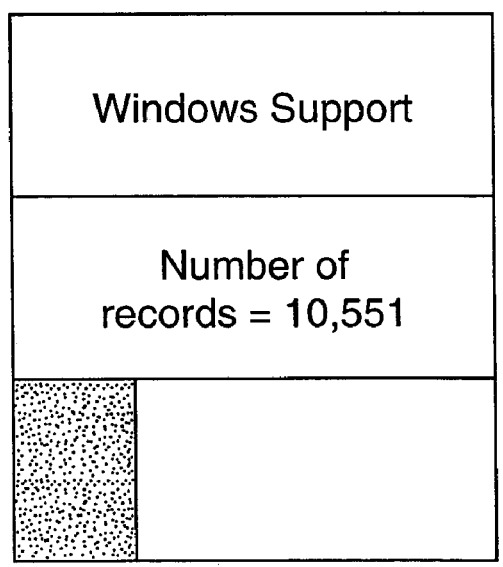

The shading within the nodes of the similarity graph indicate the size (i.e., number of records) of the category that the node represents relative to the category with the most number of records. Since category "ie" contains more records than any other category, the CV system shades the entire node representing category "ie." Since category "windows support" has a number of records that is approximately one-half the number of records in category "ie," the CV system shades approximately one-half of the node representing category "windows support." Alternatively, the shading of the nodes can represent the number of records in the category in relation to a total number of records in the collection. In such a case, the CV system would shade approximately 10% of the node representing a category that contains 10% of the records of the collection. The nodes of a category graph can also have various graphic shapes. The nodes of the similarity graph in this example are displayed as an oval containing the name of the category that the node represents. Alternatively, the nodes may be any shape such as a circle or a rectangle. FIG. 2B illustrates a sample rectangular node. The node contains the name of the category and the number of records in the category. The node also contains a shaded portion, the size of which indicates a proportion of the number of records in that category to the total number of records in the collection. Alternatively, the node might also display other statistical information such as an average value of an attribute (e.g., age) for records in the category or the mode of an attribute (e.g., color).

Figure 2C:
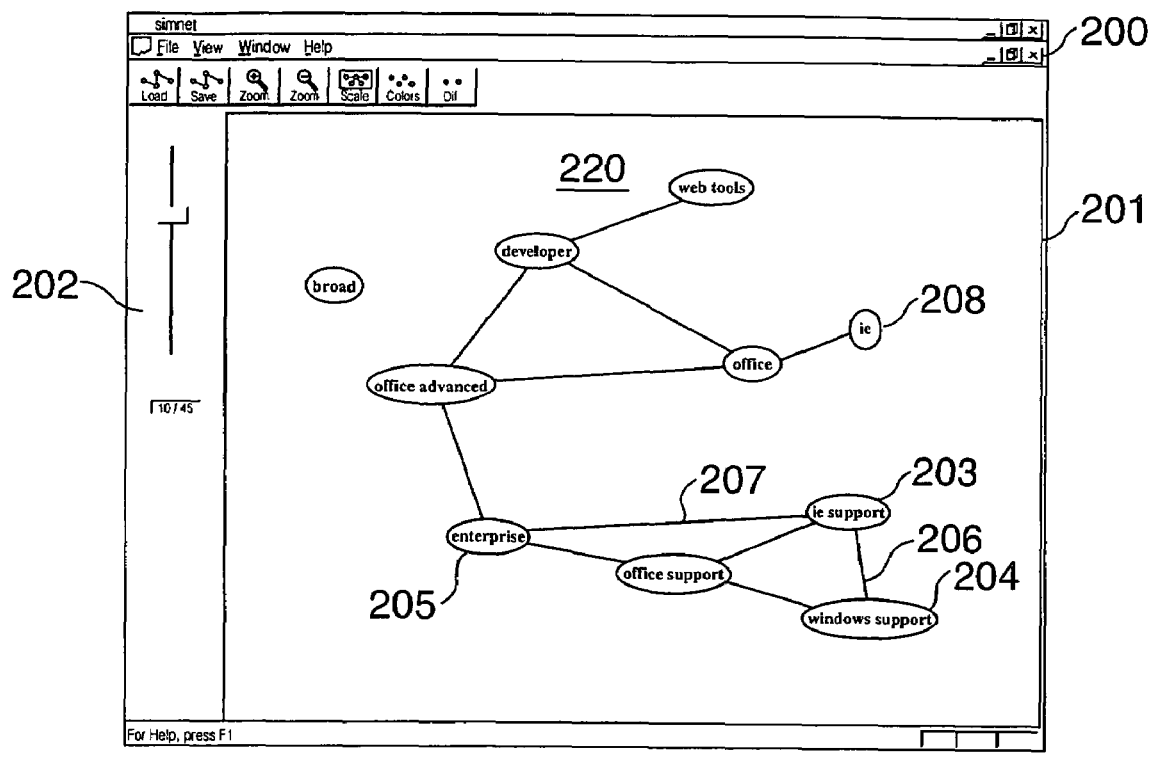

The CV system provides vertical slider 202, which alternatively may be displayed as a horizontal slider, to allow the data analyst to set the similarity threshold. As the data analyst moves the slider up and down, the similarity threshold increases or decreases, respectively. FIG. 2C illustrates an exemplary similarity graph after the data analyst has decreased the similarity threshold by moving the slider down. In this example, the similarity between category "enterprise" and category "ie support" is now greater than the similarity threshold. Thus, the CV system displays an arc 207 between node 205 representing category "enterprise" and node 203 representing category "ie support." If the data analyst then increases the similarity threshold by moving the slider to where it was previously positioned, then the CV system would remove arc 207.

Figure 2D:
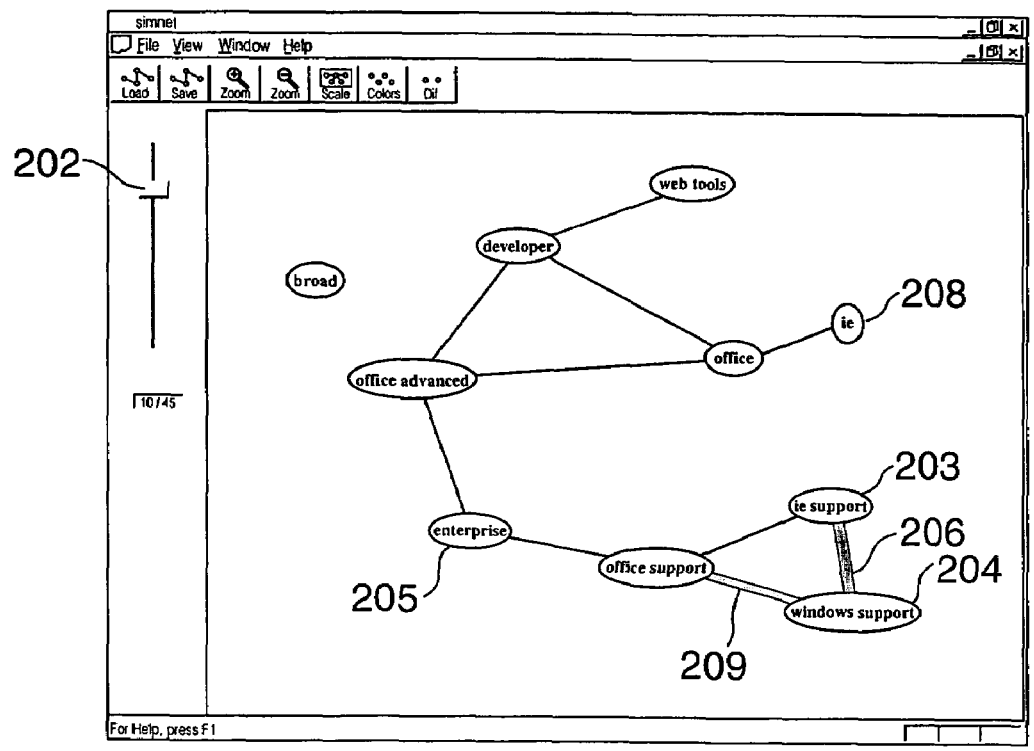

Although the arcs of FIG. 2C indicate categories whose similarity is above the similarity threshold, the arcs do not indicate relative similarity between categories. FIG. 2D illustrates an exemplary similarity graph indicating relative similarity. The CV system indicates the relative similarity of two categories by thickness of the arcs connecting the nodes. That is, the CV system displays a thick arc to connect nodes representing categories that are similar, and displays a thin arc to connect nodes representing categories that are not similar or not as similar. In this example, since category "ie support" and category "windows support" are the most similar categories, the CV system has drawn arc 206 connecting node 203 representing category "ie support" and node 204 representing category "windows support" with a thickest width. The CV system may alternatively use various graphic representations as indications of similarity between categories. For example, proximity of the nodes to one another may indicate the similarity. That is, nodes that are displayed closest to each other are most similar. Also, the similarity of nodes may be indicated by color of the arcs. For example, a green arc may indicate a high degree of similarity, whereas a red arc may indicate a low degree of similarity, and so forth with other colors and similarity differences.

Through manipulation of slider 202, the number of similarity arcs shown in a similarity network can range, with the slider at one end of its travel, from no arcs being shown to, with the slider at an opposing end of its travel, all pair-wise connections being shown. In practice, however, it is sometimes useful to limit an upper range of the slider so that not all arcs are shown. A useful upper limit for the slider is a point at which (1) the similarity network is connected (one can travel from any one node to any other) and (2) the number of arcs shown is a minimum. Furthermore, in practice, it is also useful to layout the similarity network in a manner that is pleasing to the eye. One preferred mode for doing so is to use a spring model as described in T.M.J. Fruchtermann et al, "Graph drawing by force-directed placement", *Software Practice and Experience*, Vol. 21, No. 11, 1991, pages 1129-1164 (which is incorporated by reference herein), where an apparent attractive force between nodes depends on the similarity measure between those nodes and particularly is proportional to a similarity score between those nodes.

Figure 2E:
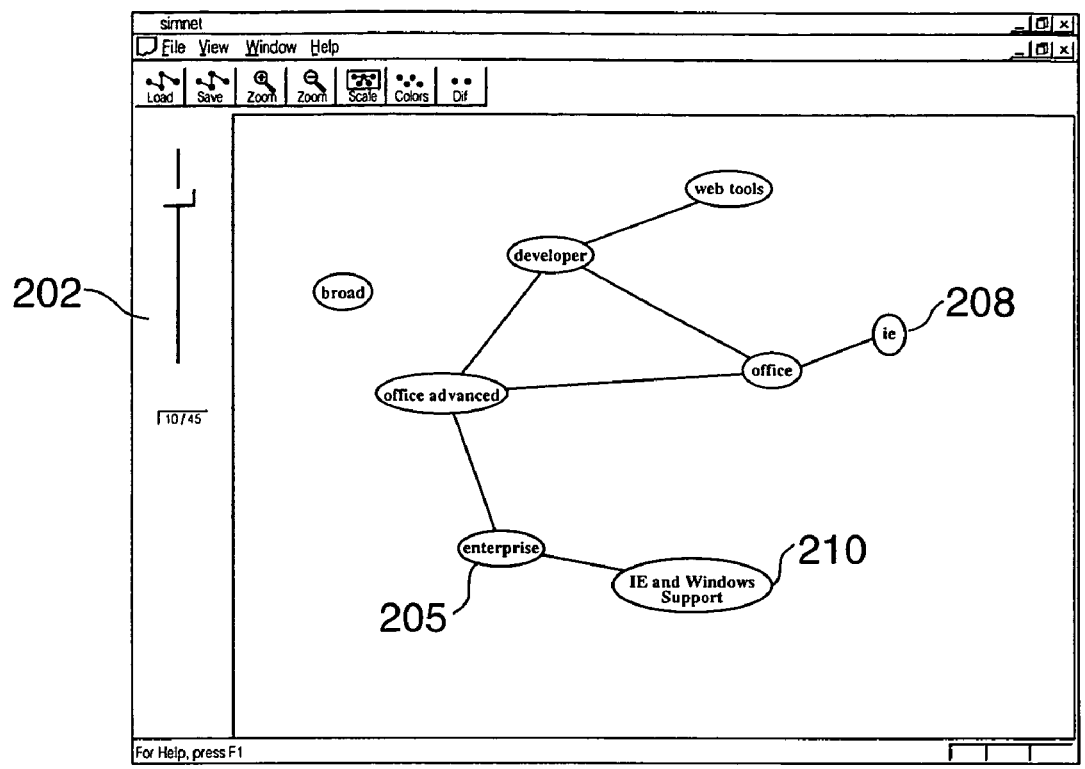

The CV system allows the data analyst to control combining and splitting of categories. In particular, the CV system allows the data analyst to combine categories that are most similar and to split categories that have been combined. The combining and splitting of categories allows the data analyst to focus on more or fewer categories, as needed. FIG. 2E illustrates the combining of the most similar categories. Here, slider 202 may be used to control the combining and splitting of categories. As the user moves the slider up an increment, the CV system selects the two categories represented by displayed nodes that are most similar and combines those categories into a single category. The CV system then removes the node for each of the categories to be combined along with arcs connected to those categories and displays a new single node representing the combined category. In this example, categories "ie support" and "windows support" are most similar. Therefore, nodes 203 and 204 and arcs connected to those nodes have been removed and node 210 representing the combined category "ie and windows support" has been added. As the user incrementally moves the slider down, the CV system splits the categories that were last combined. Thus, when the slider is moved down an increment after being incrementally moved up, then the CV system displays the same similarity graph that was displayed before the data analyst moved the slider. The CV system may animate combining and splitting of categories. That is, the CV system shows the two nodes representing categories to be combined moving towards each other to form a single node representing the combined categories. The CV system animates the splitting of nodes by showing the reverse process.

Figure 2F:
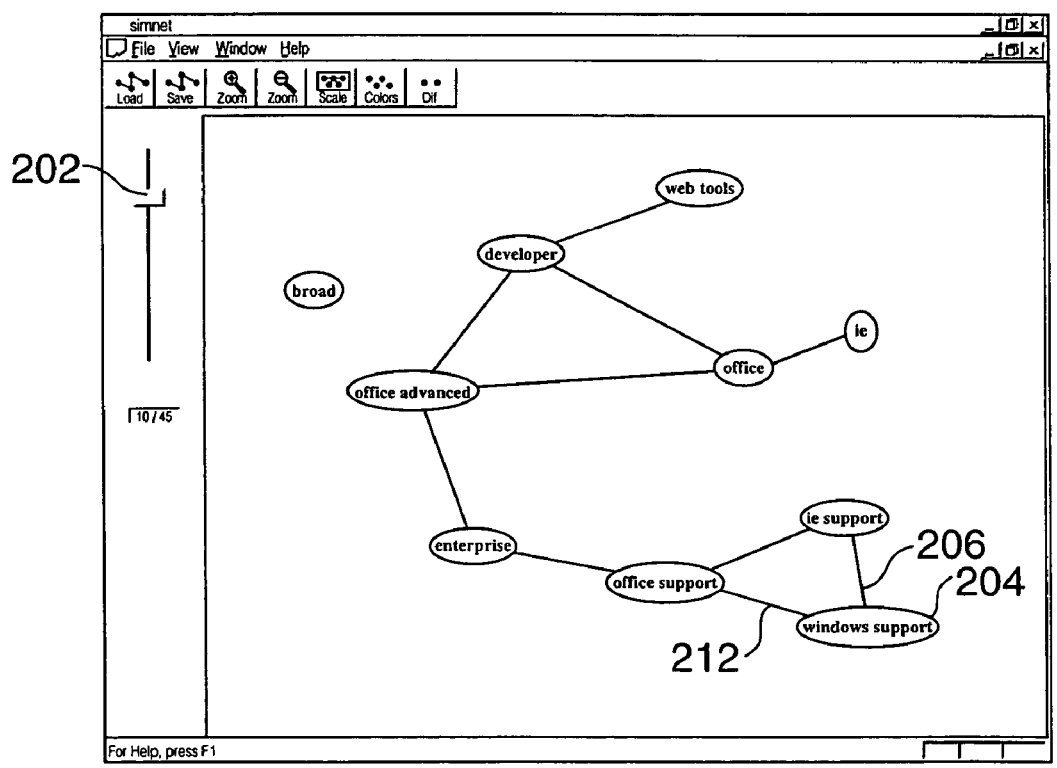

To further help a data analyst focus on certain categories, the CV system allows a data analyst to de-emphasize a category. FIG. 2F illustrates the de-emphasizing of categories. When the data analyst instructs the system to de-emphasize a category, the system either removes the node representing that category and all connecting arcs from the similarity graph or displays that node and connecting arcs in a dimmed manner. For example, if the data analyst instructs the system to de-emphasize category "windows support," then the CV system removes node 204 representing category "windows support" and connecting arcs 206 and 212.

Figure 3A:
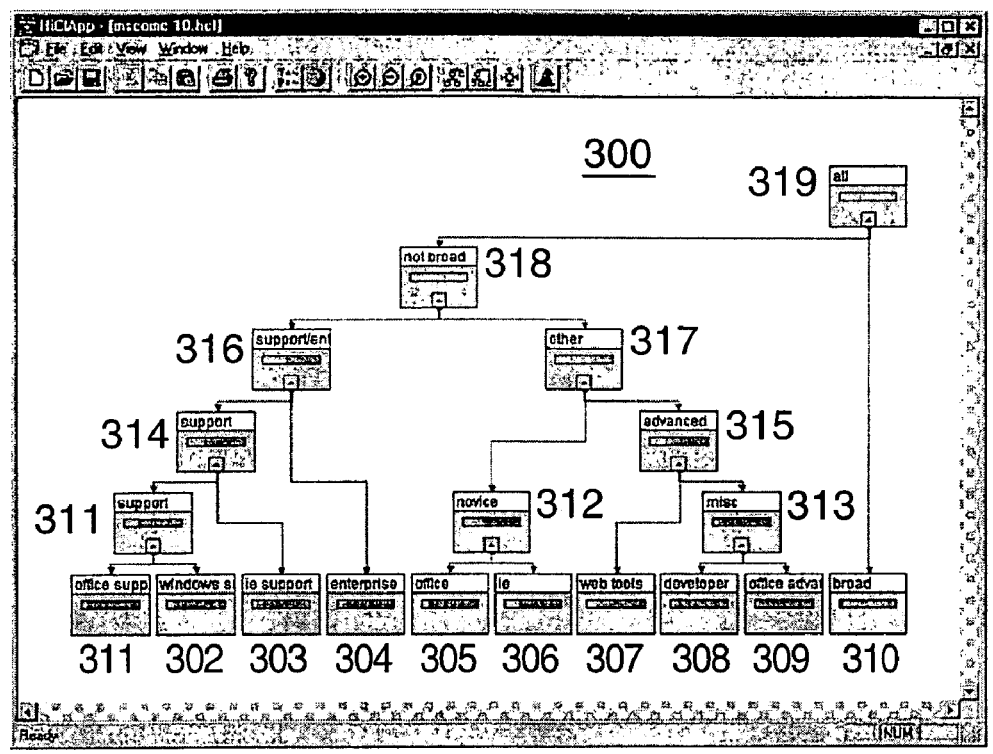
FIGS. 3A-3K collectively depict illustrative displays of a hierarchical map in a tree format and support provided for traversing this map and examining that map.
Figure 3B:
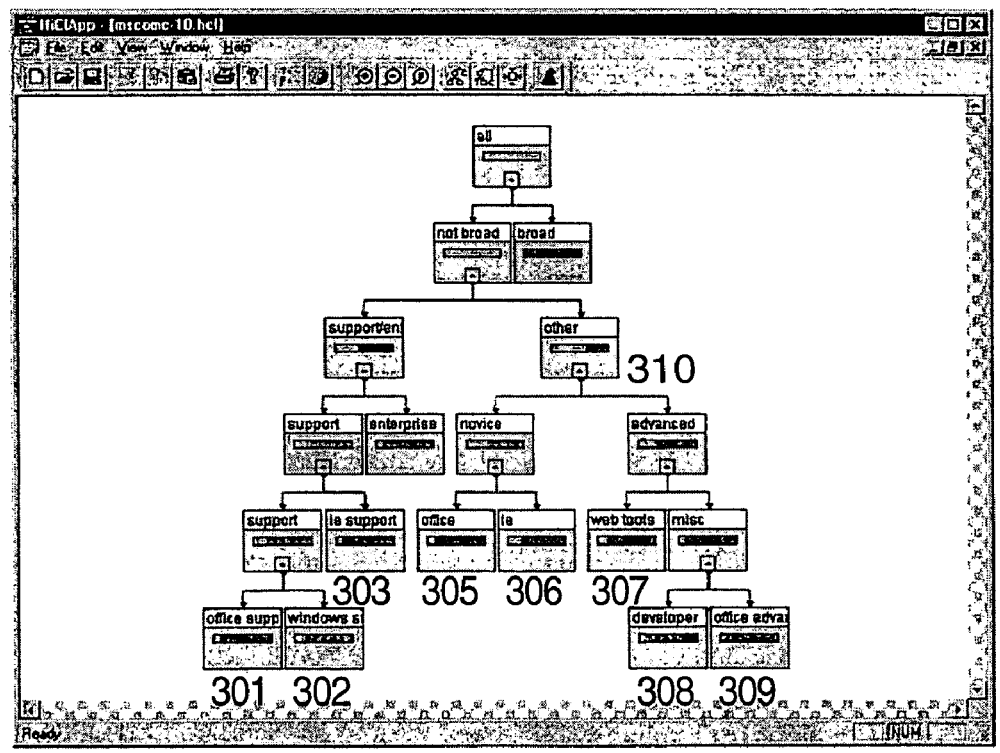

FIGS. 3A-3K and 4A-4B illustrate the display of a hierarchical map. The CV system creates a hierarchical map by starting with the base categories, and successively and iteratively combining the most similar categories in order to generate combined categories until a single combined category contains all the records of the collection. The construction of the hierarchy can be guided by an automated procedure (e.g., as described herein), by direct input from a user providing guidance as to which nodes should be merged or split next, or by a combination of both using occasional user interaction. The hierarchical map can be displayed in either tree format or circular format. With tree format selected, the CV system displays the hierarchical map in a standard tree data structure layout with the root node at a top of the display and the leaf nodes at the bottom of the display. Alternatively, the CV system may display the tree data structure upside-down with the root node at the bottom of the display and leaf nodes at the top of the display or sideways with the root node at one side of the display and the leaf nodes at an opposing side of the display. With circular format selected, the CV system displays the hierarchical map in a circular layout with the leaf nodes at the perimeter of a circle and the root node at the center. FIGS. 3A-3K illustrate display of a hierarchical map in a tree format. FIG. 3A illustrates the display of a hierarchical map in the tree format with leaf nodes horizontally aligned. The hierarchical map 300 contains leaf nodes 301-310 for corresponding base categories. The non-leaf nodes represent combined categories. For example, node 311 represents a combined category "support" that is a combination of category "office support" and category "windows support." Thus, the category represented by node 311 contains the records of the categories "office support" and "windows support." Root node 319 of the hierarchical map represents a category that contains all the records in the collection. In FIG. 3A, all the leaf nodes are displayed horizontally aligned. In contrast, FIG. 3B illustrates a hierarchical map in which the leaf nodes are not horizontally aligned. The CV system allows a data analyst to select whether to display the leaf nodes horizontally aligned. When the leaf nodes are horizontally aligned, it may be easier for the data analyst to visually identify the base categories, but more difficult for the data analyst to identify the sub-categories of a combined category.

Figure 3C:
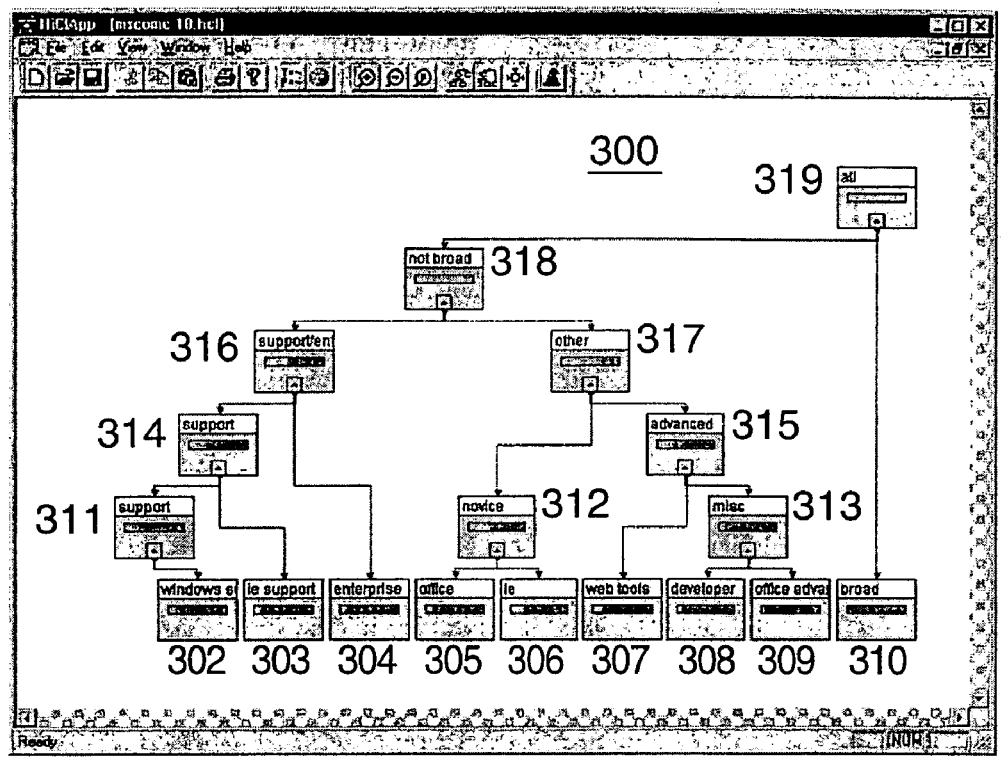
Figure 3D:
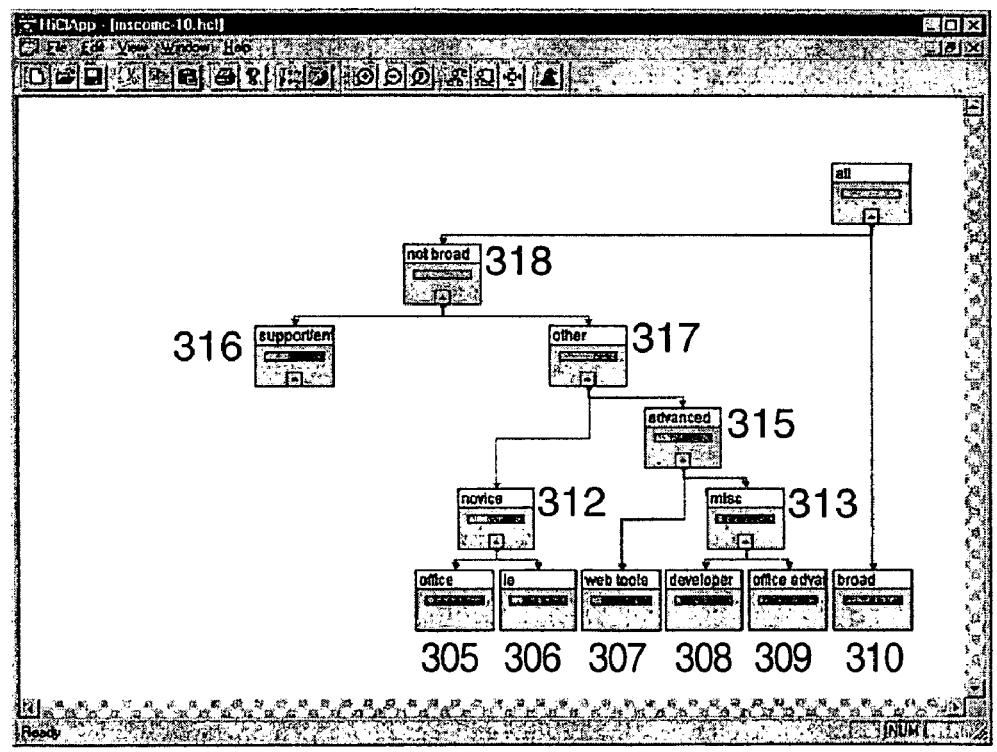

Many of the user interface features of the similarity network have analogous features in the hierarchical map. For example, FIG. 3C illustrates the de-emphasizing a base category. In this example, the data analyst has selected to de-emphasize node 301 representing base category "office support." The CV system de-emphasizes node 301 by dimming or removing it. FIG. 3D illustrates de-emphasizing a combined category. In this example, the data analyst has selected to de-emphasize node 316 representing the combined category "support/enterprise." The data analyst can select to de-emphasize both the selected node and all its descendent nodes (i.e., the subtree with the selected node as its root) or only the descendent nodes. If a data analyst selects to de-emphasize a subtree, then the CV system can represent the subtree as a single node or can dim or remove the subtree.

Figure 3E:
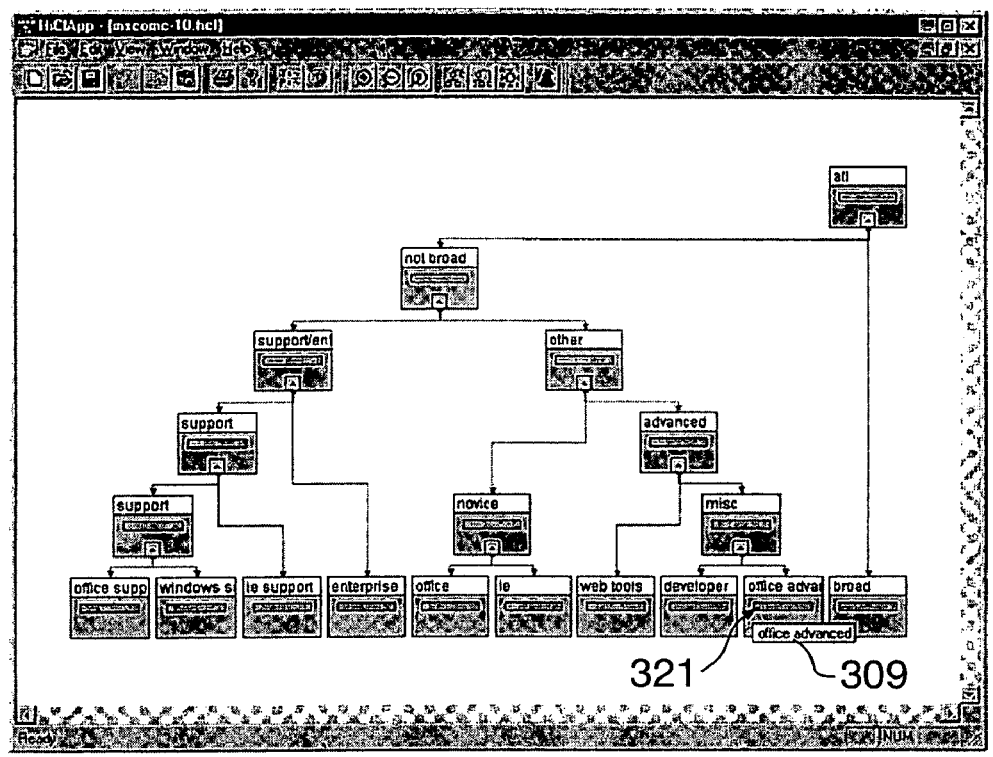
Figure 3F:
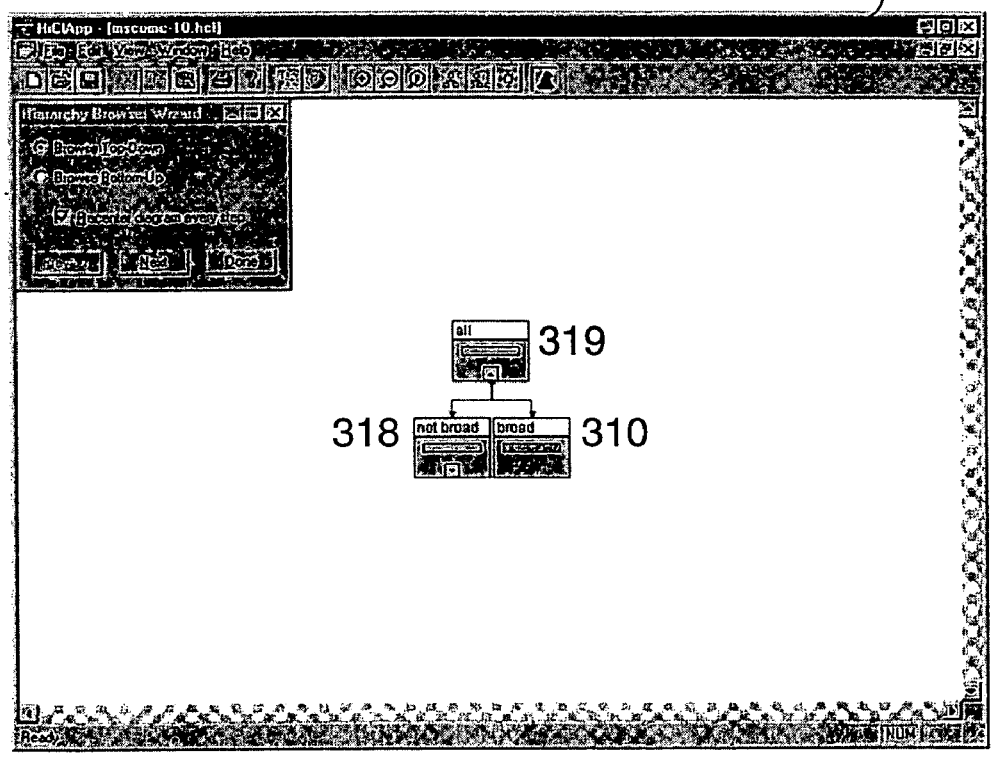

When a data analyst moves a cursor over the nodes of a category graph, the CV system displays additional information for the node. FIG. 3E illustrates movement of the cursor over a node of a hierarchical map. In this example, the data analyst has moved a cursor over node 309 representing category "office advanced." In this example, the complete name of the category is displayed. Alternatively, additional information about the node could be displayed, such as the number of records in the category.

The CV system allows a data analyst to browse through a hierarchical map in either a top-down or bottom-up manner. The browsing displays the base categories and combined categories based on similarity. When browsing from the bottom up, the CV system displays nodes representing combined categories (along with child nodes) in the same order as those combined categories were generated when the hierarchical map was created. When browsing from the top down, the CV system displays the nodes representing combined categories in the reverse order. When browsing in a top-down manner, the CV system first displays the root node and its two child nodes because the root node represents the combined category that was generated last. The CV system displays "next" and "previous" buttons for browsing down and up the nodes in the hierarchy. Alternatively, the CV system provides a slider that allows the data analyst to move forward ("next") and backward ("previous") for browsing up and down the hierarchy of nodes. In response to the data analyst selecting the "next" button, the CV system displays child nodes representing the sub-categories of the displayed node but in a reverse order to that which the combined categories were generated. Also, in response to a data analyst selection of the "previous" button, the CV system removes the last child nodes displayed. When browsing in a bottom-up manner, the CV system first displays the node (and its child nodes) representing the combined category that was generated first. In response to the data analyst selection of "next node," the CV system displays the node (and child nodes if not already displayed) representing the combined category that was next generated. Also, in response to a data analyst selection of the "previous" button, the CV system removes the node(s) displayed most recently. The CV system supports browsing a hierarchical map that is displayed in either tree or circular format.

Figure 3G:
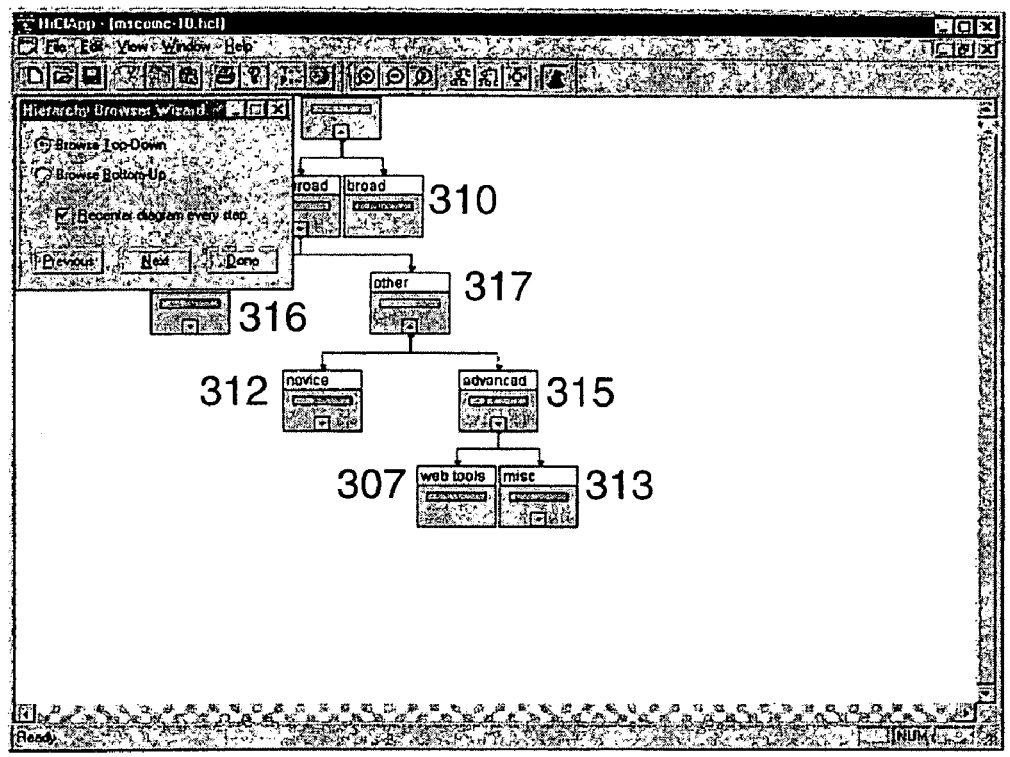

FIGS. 3F-3K illustrate the browsing features of the CV system. The browsing features allow the user to incrementally display the hierarchical map in either a top-down or a bottom-up manner. When the user selects a top-down browse, root node 319 and its two child nodes 310 and 318 are displayed initially. At each request to browse down, additional child nodes are displayed in the reverse order in which the child nodes were combined to generate combined categories. As shown in FIG. 3G, as the data analyst first requests to browse down, the CV system displays node 316 representing the combined category "support/enterprise" and node 317 representing category "other." When the data analyst next requests to browse down, the CV system displays node 312 representing category "novice" and node 315 representing category "advanced," which are child nodes of node 317 representing category "other." When the data analyst then requests to browse down, the CV system displays nodes 307 representing category "web tools" and node 313 representing category "miscellaneous," which are child nodes of node 315 representing category "advanced." In this example, the data analyst has selected to re-center the node that is being browsed down in the center of the display. Thus, node 315 is shown in the center of the display.

Figure 3H:
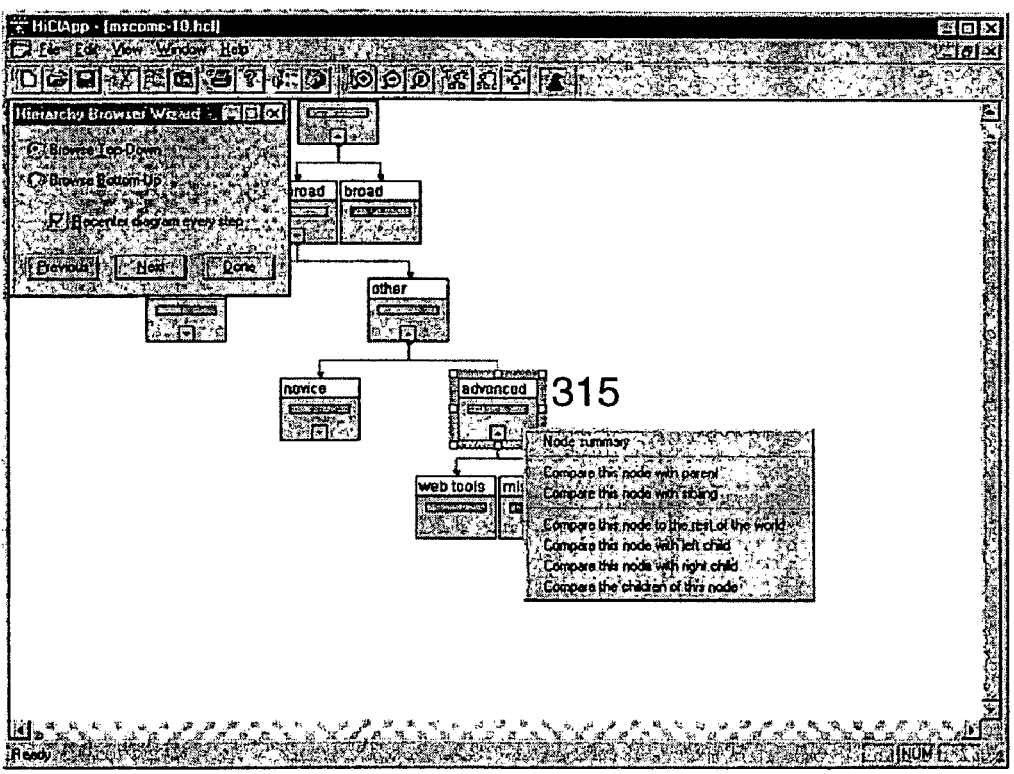

When in browsing mode, the data analyst may select a node to display a list of various options for displaying information relating to the nodes. FIG. 3H illustrates the list of options for a selected node. In this example, the data analyst has selected node 315 representing category "advanced." When the node is selected, the CV system displays a pop-up window indicating the various options that may be selected by the user. Table 2 below lists the options.

TABLE 2

Node summary

Compare this node with parent
Compare this node with sibling
Compare this node to rest of the world
Compare this node with left child
Compare this node with right child
Compare the children of this node A "node summary" includes more detailed information about the category that the node represents. For example, the node summary may include the number of records in the category and the percentage of the records that have various attribute values, which is referred to as "characteristic information". The "compare" options display similarity and discriminating information between the selected category and other categories. The discriminating information indicates which attributes distinguish the record in the selected category from records in other categories.

Figure 3I:
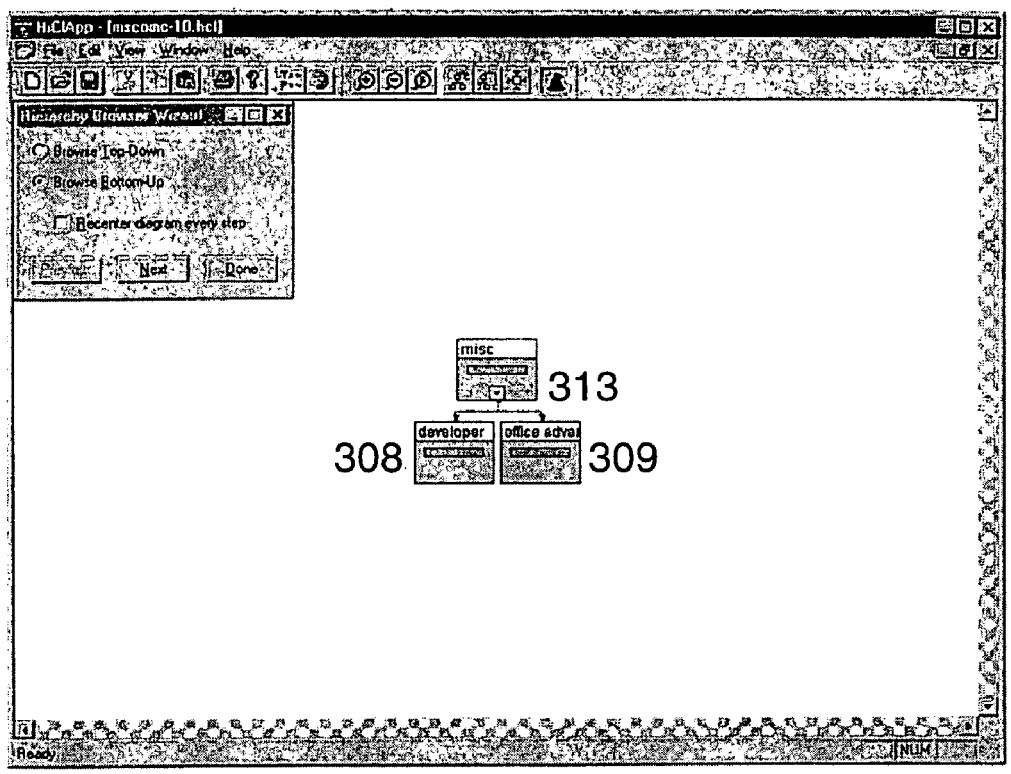
Figure 3J:
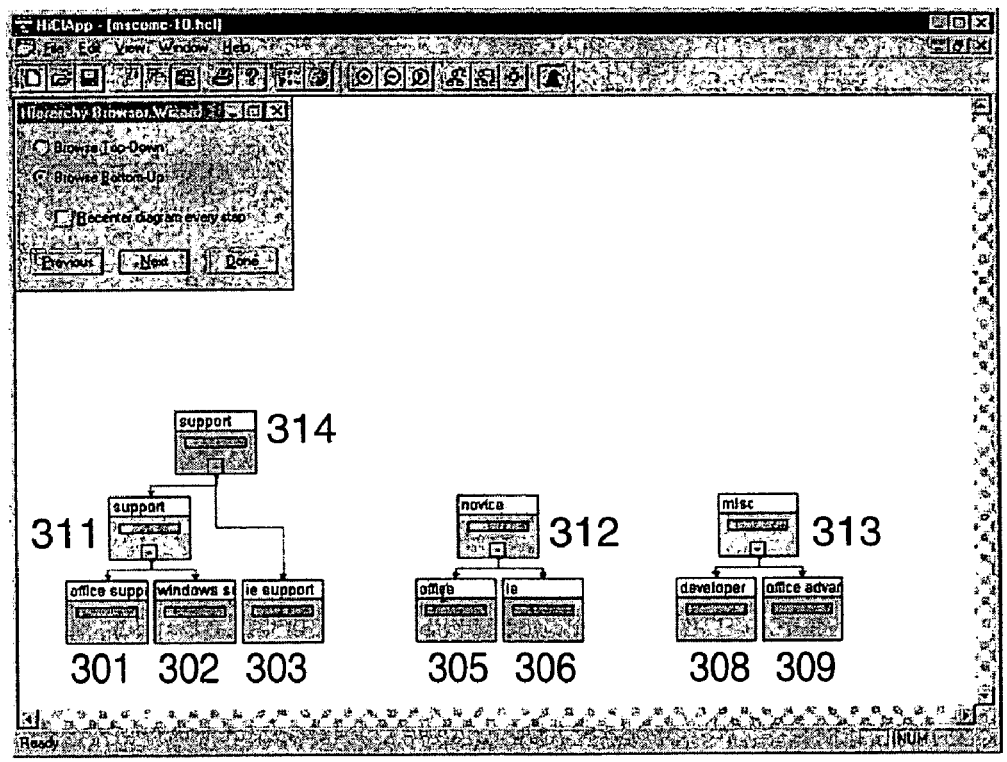
Figure 3K:
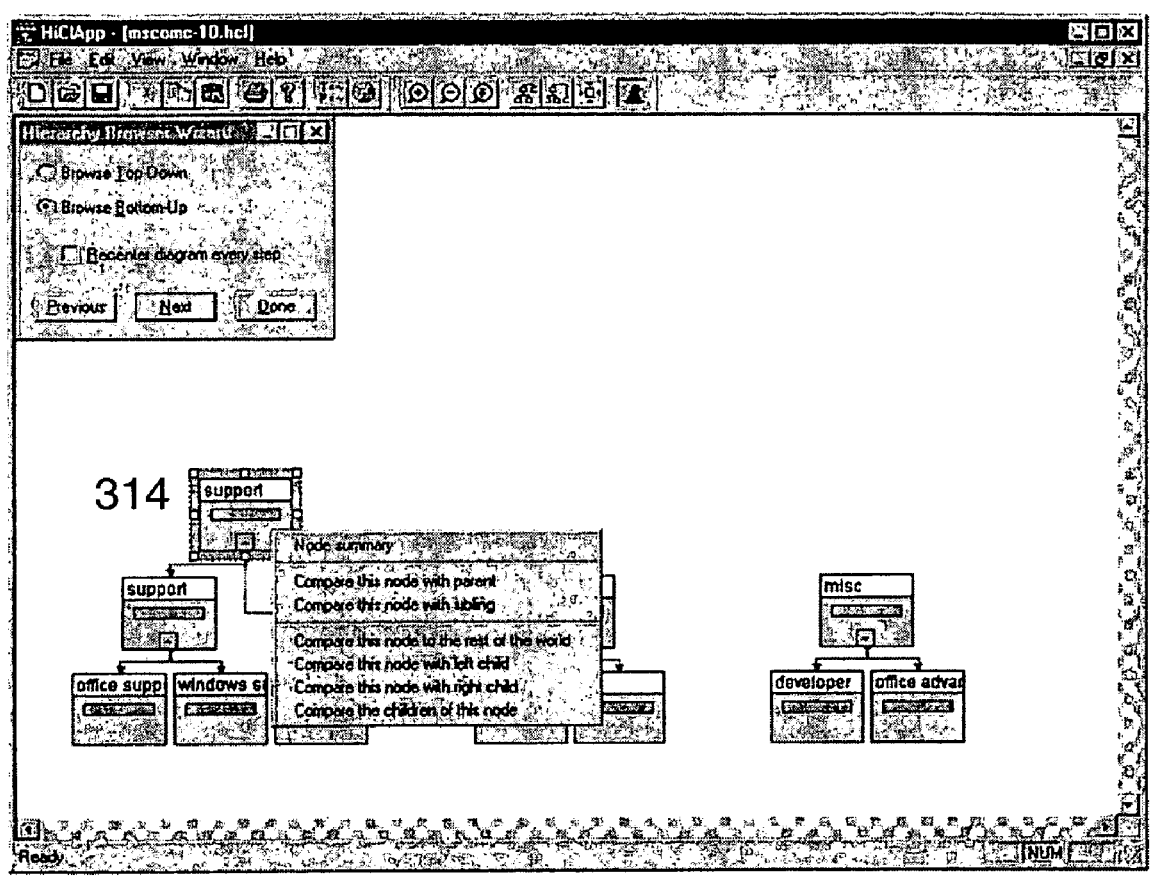

FIGS. 3I-3K illustrate browsing in a bottom-up manner. Specifically, FIG. 3I depicts an initial display in a bottom-up browse. In this example, node 313 representing combined category "miscellaneous" is displayed along with its child node 308 representing category "developer" and child node 309 representing category "office advanced", because the combined category "miscellaneous" was the first combined category generated when generating the hierarchical map. Each time the user selects the "next" button, an additional combined category is displayed in the order that the combined categories was generated. FIG. 3J illustrates a display of the hierarchical map after the user has selected the "next" button three times. When the data analyst selects "next" button the first time, then the CV system displays node 311 representing the "support" category plus its child node 301 representing category "office support" and child node 302 representing category "windows support." When the data analyst selects the "next" button for the second time, then the CV system displays node 312 representing category "novice" and its child node 305 representing category "office" and child node 306 representing category "ie." When the data analyst selects the "next" button for the third time, the CV system displays node 314 representing category "support" along with its child node 303 representing the category "ie support." The other child node 311 representing combined category "support" is already displayed. FIG. 3K depicts selection of node 314 representing the category "support." The data analyst may also use a slider to browse the hierarchy up or down rather than use the "previous" and "next" buttons. The CV system can also animate the browsing of the hierarchical maps. When animating the browsing in a bottom-up manner, the CV system progressively displays the nodes from the bottom of the hierarchy towards the top at, for example, periodic time intervals. When animating browsing in a top-down manner, the CV system displays the root node first and then displays additional nodes periodically until the leaf nodes are displayed.

Figure 4:
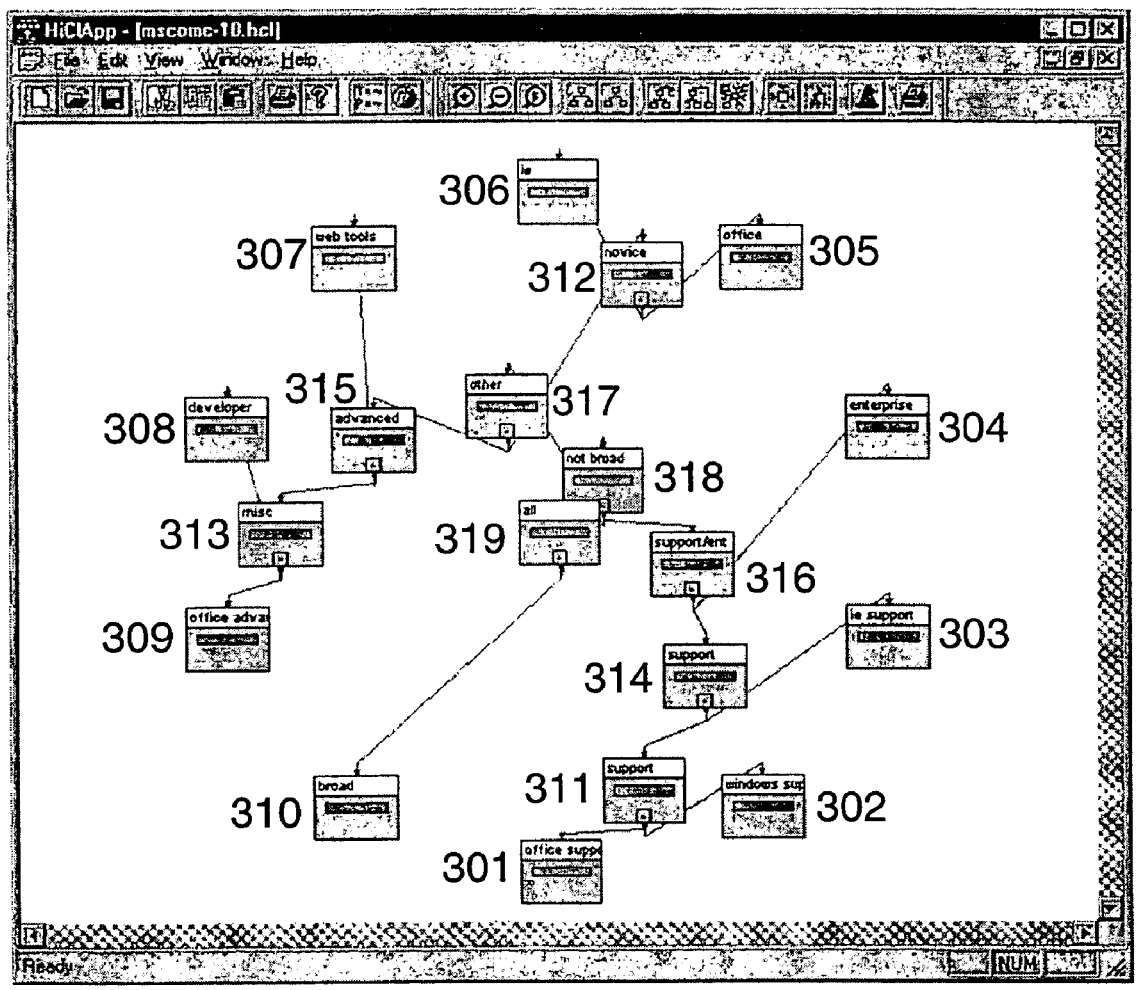
FIG. 4 depicts an illustrative display of a hierarchical map in a circular format.

FIG. 4 illustrates a hierarchical map displayed in a circular format. The leaf nodes of the hierarchy are displayed in a circle. The root node of the hierarchy is displayed in a center of the circle. The other non-leaf nodes are displayed between the root node and the surrounding leaf nodes. The same visualization features (e.g., browsing and de-emphasizing) that are used with the tree format can be used with the circular format of the hierarchical map. Also, similarity information can be displayed along with a hierarchical map by, for example, using different color arcs to connect nodes representing the different categories. Thus, a similarity graph is effectively superimposed on a hierarchical map.

Figure 5A:
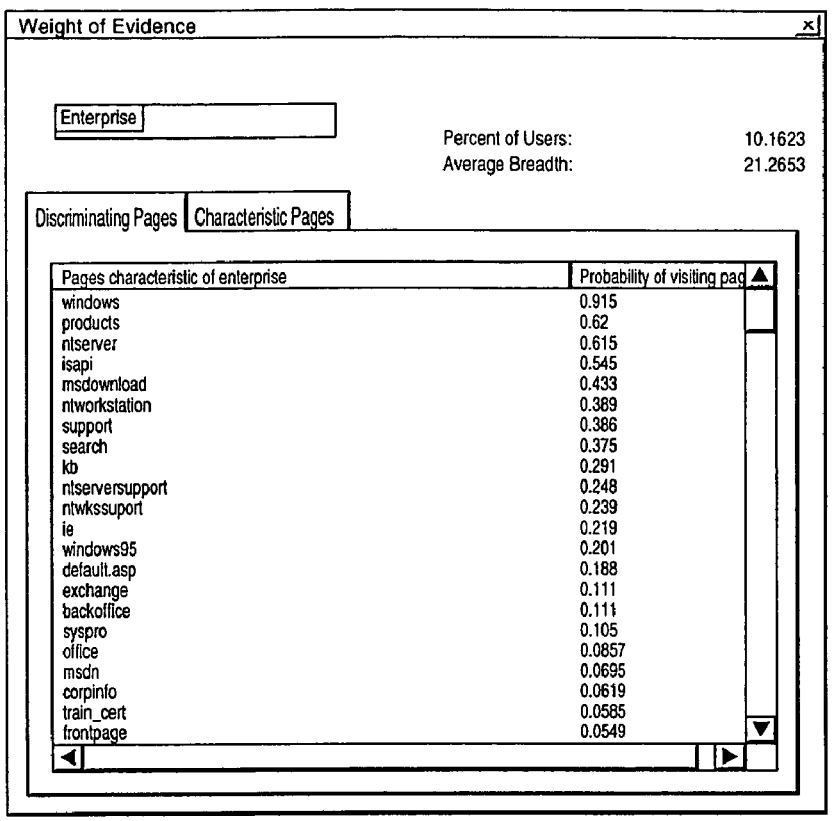
FIG. 5A depicts characteristic pages of a category of users of web pages.
Figure 5B:
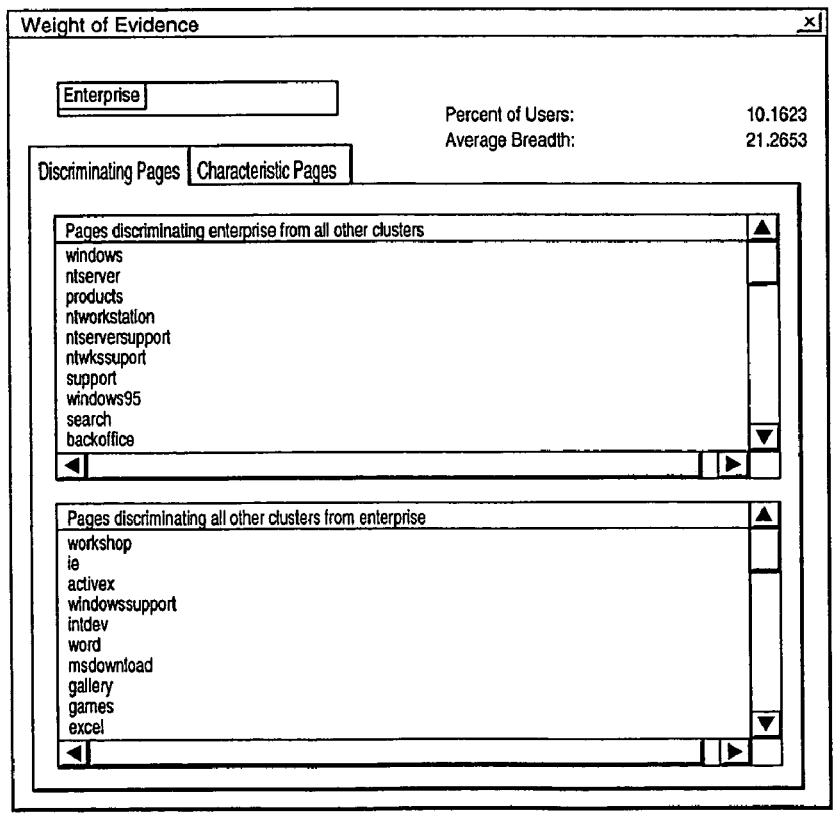
FIG. 5B depicts discriminating pages for a category of users of web pages.
Figure 5C:
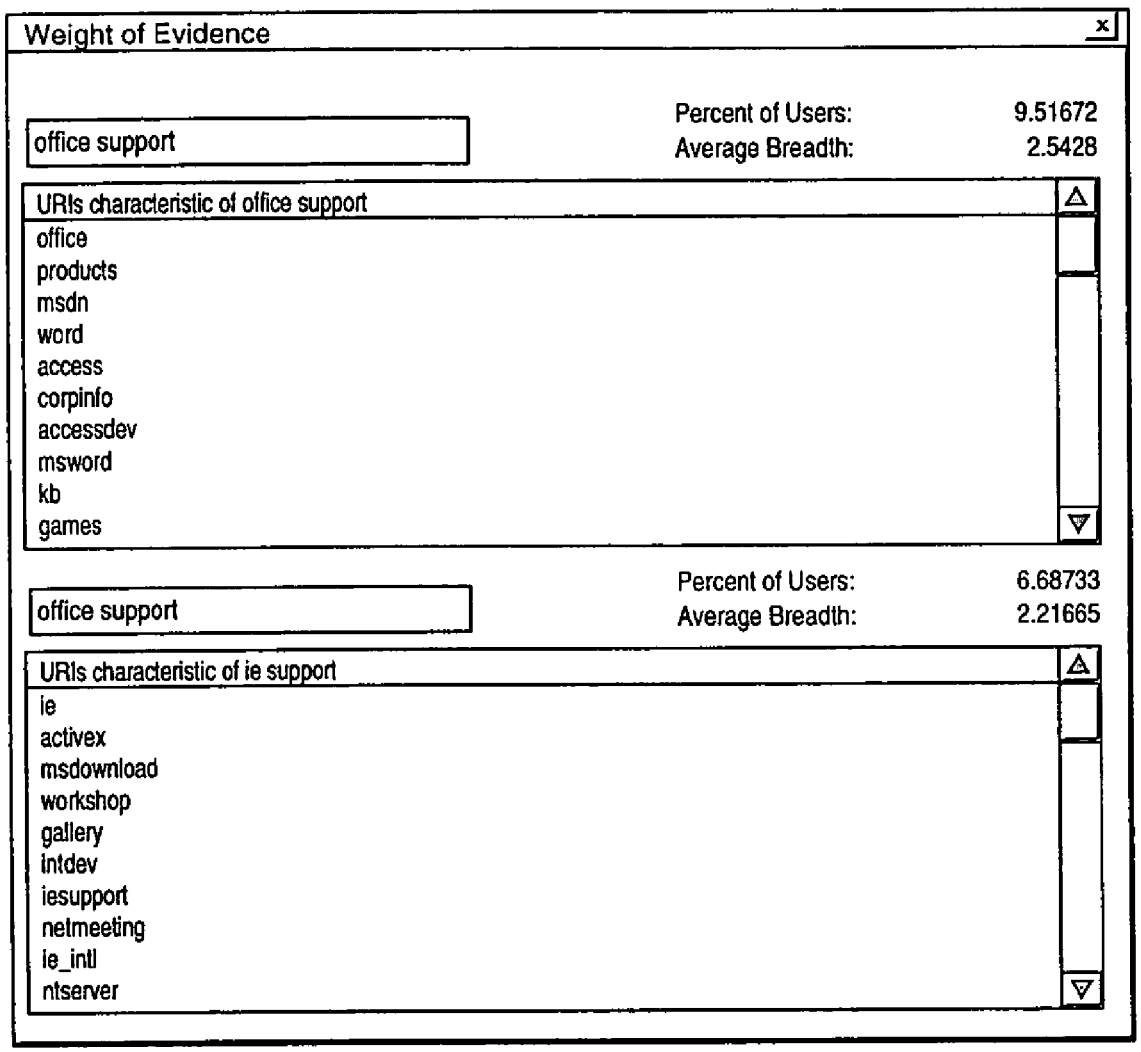
FIG. 5C depicts pair-wise discrimination for two categories of users of web pages.

The CV system displays additional information about categories when requested by a data analyst. This additional information includes characteristic and discriminating information. FIGS. 5A-5C illustrate weights of evidence information that may be displayed when a data analyst selects a node of a category graph. The weights of evidence information includes identification of discriminating pages and characteristic pages. FIG. 5A illustrates the display of the characteristics pages of category "enterprise." The characteristic pages list the web pages that are accessed by the users in a category in order based on a corresponding probability that a user in the category accesses each such web page. The probability for any such page is equal to the number of users in the category who access the web page divided by the number of users in the category. The characteristic pages of category "enterprise" indicates that a user in that category has 0.915 probability of accessing the "windows" web page. Also, a user in that category has a 0.62 probability of accessing the "products" web page.

FIG. 5B illustrates the discriminating pages for the category "enterprise." The top panel illustrates the web pages that discriminate the category "enterprise" from all other categories. The web pages are listed in order based on their ability to discriminate all other categories. Web pages that tend to be accessed by the users of a category and not accessed by users of the other categories are likely to be most discriminating. In this example, the "windows" web page, the "ntserver" web page, the "products" web page, and so on serve to discriminate users in category "enterprise" from all others. A bottom panel indicates the web pages that discriminate all other categories from "enterprise" category. Web pages accessed by users of the other categories and not accessed by users of a selected category tend to be most discriminating. In this example, the "workshop" web page, the "ie" web page, and so on are used to discriminate all of the categories from the category "enterprise." An example mathematical basis for discrimination is provided below.

FIG. 5C illustrates the display of pair-wise discrimination for two categories. In this example, the user has selected to display information that tends to discriminate category "office support" from category "ie support." As shown by a top panel, the users of the category "office support" tend to use the "office" web page, whereas users of category "ie support" tend not to use the "office" web page. In contrast, the users of the category "ie support" tend to use the "ie" web page, whereas users of category "office support" tend not to use that particular web page.

Figure 6A:
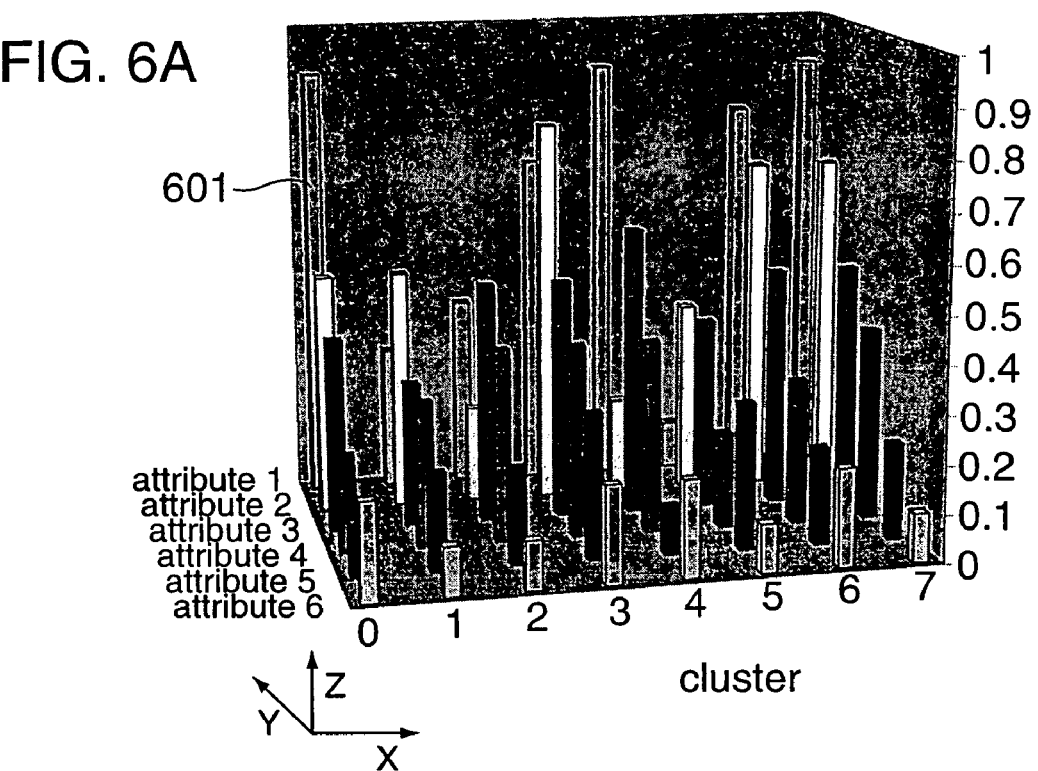
FIGS. 6A-6B collectively depict 3-dimensional graphs of probability of each attribute for binary attributes for various clusters.
Figure 6B:
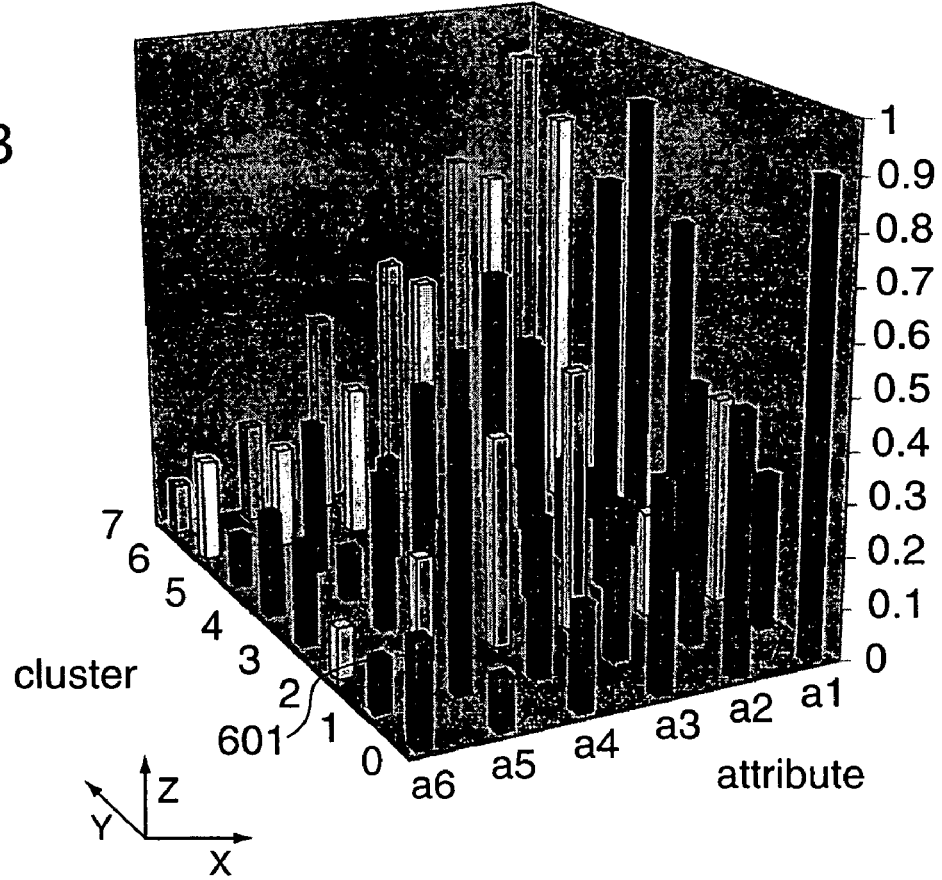

The CV system provides for displaying certain information in a 3-D graphical form. FIG. 6A illustrates a 3-D graph of probability that each attribute equals one for each binary attribute. The x-axis represents the categories (clusters), the y-axis represents the attributes, and the z-axis represents the probabilities. For example, the height of bar 601 represents the probability (of approximately 0.1) that a record in category 1 will have a value of one. In this example, indicator bars for a given attribute are shown in the same color or shade. FIG. 6B illustrates a 3-D graph of the same information as the graph of FIG. 6A except that the bars for a given category, rather than a given attribute, are shown in the same color or shade. These graphs therefore allow a data analyst to focus on attributes or categories.

Figure 7:
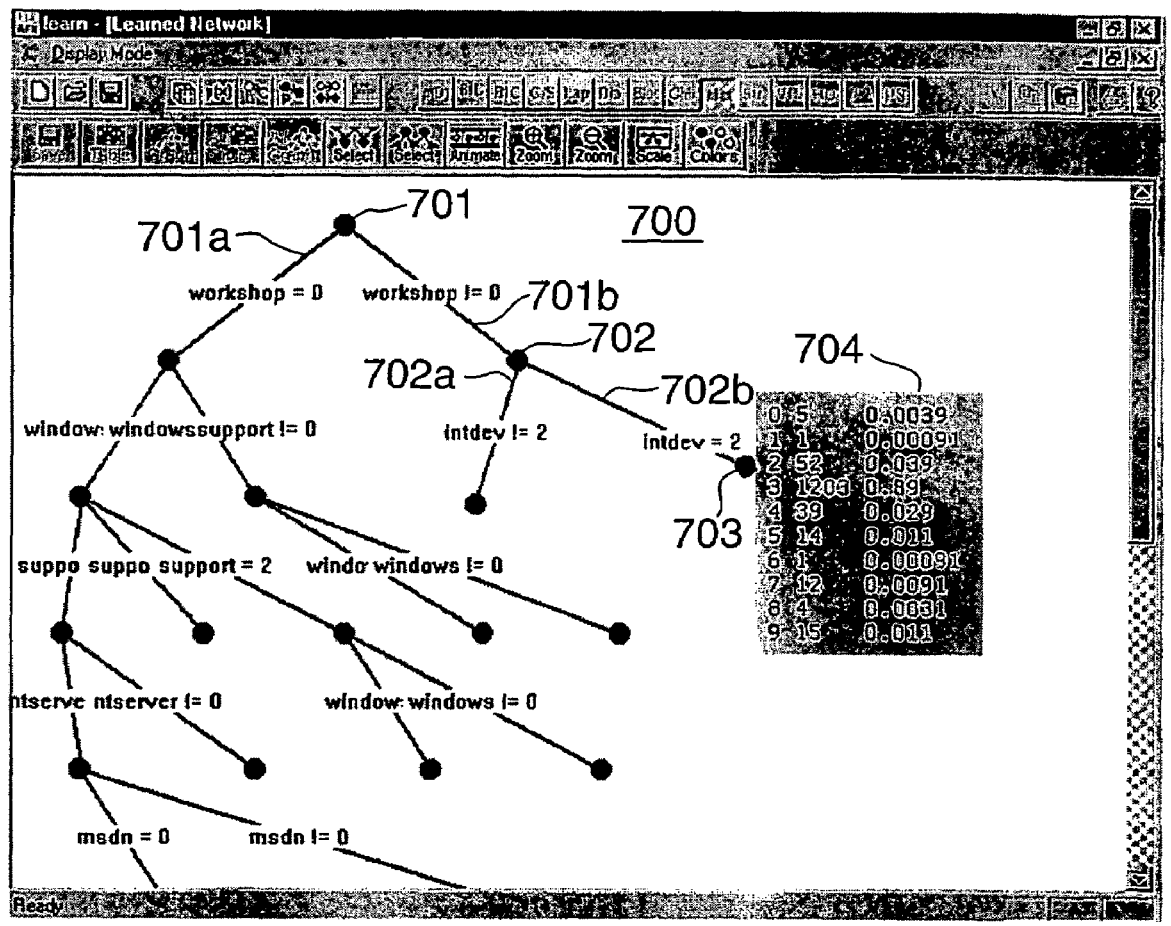
FIG. 7 depicts a decision tree format for displaying categories of a collection.

The CV system also provides for displaying categories in a decision tree format. FIG. 7 illustrates a decision tree format for displaying the categories of a collection. Decision tree 700 contains nodes corresponding to attributes and arcs corresponding to values of that attribute. The decision tree has node 701 corresponding to the attribute indicating whether a user accessed the "workshop" web page and arcs 701a and 701b indicating the values of zero and non-zero for that attribute. Node 702 corresponds to the attribute indicating whether a user accessed the "intdev" web page and arcs 702a and 702b indicating the values of 2 and not 2. Thus, each node, except the root node, represents a setting of attribute values as indicated by the arcs in the path from that node to the root node. When a data analyst selects a node, the CV system displays a probability for each category that a record in that category will have the attribute settings that are represented by the path. For example, when the data analyst selects node 703 representing the attribute setting of accessing the "workshop" web page at least once and accessing the "intdev" web page twice, the CV system displays table 704. The table identifies the categories, the number of records in each category that matches those attribute settings, and the probabilities. For example, the first line "0 5 0.0039" indicates that category 0 has 5 records that match the attribute settings and that the probability for category 0 is 0.0039. The CV system generates the decision tree by adding a column to a collection of records that contains the category of record. The CV system then applies a decision tree algorithm (see, e.g., D. Chickering, et al, "A Bayesian Approach to Learning Bayesian Networks with Local Structure," *Proceedings of the Thirteenth Conference on Uncertainty in Artificial Intelligence,* 1997; which is incorporated by reference herein) to build a decision tree (or graph) in which the category column represents the target variable.

Similarity, as used in the present invention, corresponds to "distance" between the records (cases) in two categories (clusters). We will now present a mathematical basis for calculating such a distance.

In the following, $X_1, \ldots, X_m$ refers to the variables representing the attributes and $x_1, \ldots, x_m$ refers to the state of a variable, that is, the attribute values. First, however, various probabilities are defined that are used to calculate the distance. The probability of a record in a collection having attribute values $x_1, \ldots, x_m$ is represented by a joint probability density function given by the following equation:

$$p(x_1, \ldots, x_m) = \sum_j p(h_j) p(x_1, \ldots, x_m | h_j) \qquad (1a)$$

where: $h_j$ represents category j, where $p(h_j)$ represents the probability that any record is in category j;

$p(x_1, \ldots, x_m | h_j)$ represents a conditional probability that a record has attribute values $x_1, \ldots, x_m$ given that it is a record from category j. The probability that a record is in category j is given by the following equation:

$$p(h_j) = \frac{\text{size}(h_j) + \alpha_j}{\sum_j \text{size}(h_j) + \alpha_j} \qquad (1b)$$

where: size $(h_j)$ is a count of a total number of records in category j, and the $\alpha_j$ are hyper-parameters (e.g., $\alpha_j=1$ for all j). For example, if category j contains 10,000 records and the collection contains 100,000 records, then $p(h_j)=0.1$.

It may be assumed that the probability, that a record with attribute values $x_1, \ldots, x_m$ is in category j, is the product of the probabilities for each attribute value that a record in category j has that attribute value and is given by the following equation:

$$p(x_1, \ldots, x_m | h_j) = \prod_i p(x_i | h_j) \qquad (1c)$$

where: $p(x_i/h_j)$ is the conditional probability that a record has the attribute value $x_i$ for attribute i given that it is in category j. This probability is given by the following equation:

$$p(x_i | h_j) = \frac{\text{size}(x_i, h_j) + \alpha_{ij}}{\sum_{y_i} \text{size}(y_i, h_j) + \alpha_{ij}} \qquad (1d)$$

where: size($x_i,h_j$) is the number of records in category j with a value for attribute i that equals the attribute value $x_i$, where the summation is over all values of attribute i and where $\alpha_{ij}$ are hyper-parameters (e.g., $\alpha_{ij}=1$, for all i and j). For example, if category j contains 10,000 records and 100 of those records have a value of 1 for attribute i, then $p(1/h_j)=0.01$. Equation (1a) can be re-written by substituting Equation (1c) as the following equation:

$$p(x_1, \ldots, x_m) = \sum_j p(h_j) \prod_i p(x_i | h_j) \qquad (1e)$$

Through a first technique, distance, i.e., similarity, between two categories is given by the sum of the Kullback-Leibler (KL) distance between the records in the first category and the records in the second category and the KL distance between the records in the second category and the records in the first category. This distance is given by the symmetric divergence (see H. Jefferys, *Theory of Probability,* (© 1939, Oxford University Press)) as indicated in Equation 2(a) as follows:

$$\text{dist}(h_1, h_2) = KL(p(X_1, \ldots, X_m | h_1), p(X_1, \ldots, X_m | h_2)) + KL(p(X_1, \ldots, X_m | h_2), p(X_1, \ldots, X_m | h_1)) \qquad (2a)$$

Equation (2a) reduces to the following equation:

$$\text{dist}(h_1, h_2) = \sum_{x_1, \ldots, x_m} (p(x_1, \ldots, x_m | h_1) - p(x_1, \ldots, x_m | h_2)) \log \frac{p(x_1, \ldots, x_m | h_1)}{p(x_1, \ldots, x_m | h_2)} \qquad (2b)$$

Thus, the distance between the first and second categories is the sum, for all possible combinations, of attribute values, of a first probability that a record with that combination of attribute values is in the first category minus a second probability that a record with that combination of attribute values is in the second category multiplied by a logarithm of the first probability divided by the second probability. Since Equation (2b) requires a summation over all possible combinations of attribute values, the determination of the similarity using this formula is computationally expensive. When Equation (1c) is substituted into Equation (2d), the result is the following equation:

$$dist(h_1, h_2) = \sum_i \sum_{x_i} (p(x_i|h_1) - p(x_i|h_2)) \log \frac{p(x_i|h_1)}{p(x_i|h_2)} \quad (2c)$$

Advantageously, Equation (2c) requires only the summation over all possible values of each attribute, and not over all possible combinations of attributes, and is thus computationally much more efficient than Equation (2b).

Equation (2c) or, alternatively, Equation (2b) provides a way to calculate the similarity for a pair of base categories. Several different equations can be used to calculate the similarity between two combined categories. For example, when two categories are combined into a combined category, then the similarity between the combined category and every other category (combined or not combined) needs to be calculated for the display of a similarity graph. Equations (3a), (3b), and (3c) provide three different techniques for calculating the similarities with combined categories. The first technique averages the similarity between each pair of categories of the first and second combined categories and is given by the following equation:

$$dist(G_1, G_2) = \sum_{h_j \in G_1, h_k \in G_2} p(h_j) p(h_k) dist(h_j, h_k) \quad (3a)$$

where: $G_1$ represents the first combined category and $G_2$ represents the second combined category.

Thus, the distance is the summation of the distances between each pair of categories multiplied by the probabilities (the latter being given by Equation (1b)) that a record is in each of the categories. The second and third techniques calculate the distance as either the minimum or maximum distance between any two pairs of categories in the first and second combined categories and are given by the following equations:

$$dist(G_1, G_2) = \min\{dist(h_j, h_k) | h_j \in G_1, h_k \in G_2\} \quad (3b)$$

$$dist(G_1, G_2) = \max\{dist(h_j, h_k) | h_j \in G_1, h_k \in G_2\} \quad (3c)$$

Another technique for calculating the distance is by treating a combined category as a non-combined category having the records of the corresponding sub-categories. This technique results in Equation (4a) as follows:

$$dist(G_1, G_2) = \sum_{x_1, \ldots, x_m} (p(x_1, \ldots, x_m|G_1) - p(x_1, \ldots, x_m|G_2)) \log \frac{p(x_1, \ldots, x_m|G_1)}{p(x_1, \ldots, x_m|G_2)} \quad (4a)$$

where: $p(x_1, \ldots, x_m/G)$ is the conditional probability that a record has attribute values $x_1, \ldots, x_m$ given that it is a record from the combined category G. This probability is given by the following equation:

$$p(x_1, \ldots, x_m|G) = \frac{\sum_{h_j \in G} p(h_j) p(x_1, \ldots, x_m|h_j)}{\sum_{h_j \in G} p(h_j)} \quad (4b)$$

where: the denominator is the sum of the probabilities that any record is in each category G and the numerator is the sum for each category j in G of the probability that the record with attribute values $x_1, \ldots, x_m$ is in category j multiplied by the probability that a record in the collection is in category j.

Equation (4a), however, cannot be factored in the same way as Equation (2b). Hence, determining the distance between combined categories $G_1$ and $G_2$ is computationally expensive because a summation over all possible combinations of attribute values is needed. For example, if there are 10 attributes with approximately 5 possible attribute values each, then there are approximately $10^7$ possible combinations of attribute values. Therefore, as one technique, the CV system approximates the distance using a Monte Carlo method such as simple sampling from $G_1$ and $G_2$ where $s_1, \ldots, s_r$ denote the samples from $G_1$, and where $t_1, \ldots, t_s$ denote the samples from $G_2$ (each $s_i$ and $t_i$ correspond to the observations $x_1, \ldots, x_n$ for all attributes). See, e.g., Shachter et al, "Simulation Approaches to General Probabilistic Inference in Belief Networks", *Uncertainty in Artificial Intelligence,* 1990, Vol. 5, pp. 221-231—which is incorporated by reference herein. The CV system approximates the distance between two combined categories by taking the sample data sets and applying them to the following:

$$dist(G_1, G_2) = \sum_{h_j \in G_1, h_k \in G_2} p(h_j) p(h_k) dist(h_j, h_k) \quad (5a)$$

where: $p(s_i|G_j)$ and $p(t_i|G_j)$ are computed using Equation (4b). The number of samples from $G_1$ and $G_2$ is taken in proportion to $p(G_1)$ and $p(G_2)$, where $p(G_j)$ is the probability that a record is in the set of categories defined by $G_j$.

This Monte Carlo method can be used to calculate the distance between both base and combined categories when Equation (2b), without an independence assumption, is used to determine distance.

Another technique for calculating distance is to assume that the individual attributes are conditionally independent given $G_1$, $G_2$ and the set of clusters not in a union of $G_1$ and $G_2$, yielding Equation (5b) as follows:

$$dist(G_1, G_2) = \sum_i \sum_{x_i} (p(x_i|G_1) - p(x_i|G_2)) \log \frac{p(x_i|G_1)}{p(x_i|G_2)} \quad (5b)$$

As discussed above, attribute-value discrimination refers to how well the value of an attribute distinguishes the records of one category from the records of another category. One technique for calculating attribute-value discrimination is given by Equation (6a) as follows:

$$discrim(x_i \mid G_1, G_2) = (p(x_i \mid G_1) - p(x_i \mid G_2))\log\frac{p(x_i \mid G_1)}{p(x_i \mid G_2)} + \quad (6a)$$

$$(p(x_i \mid G_2) - p(x_i \mid G_1))\log\frac{1 - p(x_i \mid G_1)}{1 - p(x_i \mid G_2)}$$

where: the probability that a record with a value of $x_i$ for attributes in combined category $G_1$ is given by the following equation:

$$p(x_i \mid G) = \frac{\sum_{h_j \in G} p(h_j) \prod_i p(x_i \mid h_j)}{\sum_{h_j \in G} p(h_j)} \quad (6b)$$

Attribute-value discrimination scores can be positive, negative or zero. If score $discrim(x_i|G_1, G_2)$ is positive, then an observation of the attribute value $x_i$ makes $G_1$ more likely than $G_2$. If the score $discrim(x_i|G_1, G_2)$ is negative, then the observation of the attribute-value $x_i$ makes $G_1$ less likely than $G_2$. If the score $discrim(x_i|G_1, G_2)$ is zero, then the observation of the attribute-value $x_i$ leaves the relative probabilities of $G_1$ and $G_2$ the same. The last case almost never occurs.

There are several possibilities for displaying the attribute values and their corresponding discrimination scores. For example, in one instance, all attribute values are displayed such that: (1) the attribute values with positive and negative scores appear in separate areas of the screen, and (2) the attribute values with the largest scores (in absolute value) appear higher in the list. Alternatively, the discrimination scores for all attribute values except distinguished values (e.g., $x_i$=0) are displayed. Also, non-binary attributes may be binarized into attributes that have only values zero and non-zero before being displayed. The homogeneity of a category indicates how similar the records of the category are to one another. The homogeneity is given by Equation (7) as follows:

$$hom(G) = \sum_{users} p(G \mid x_1, \ldots, x_m)\log p(x_1, \ldots, x_m \mid G) \quad (7)$$

where: G represents a category or a combined category and where $p(G|x_1, \ldots, x_m)$ is the probability that category G contains the record with attribute values $x_1, \ldots, x_m$ (obtainable from Bayes rule).

Figure 8:
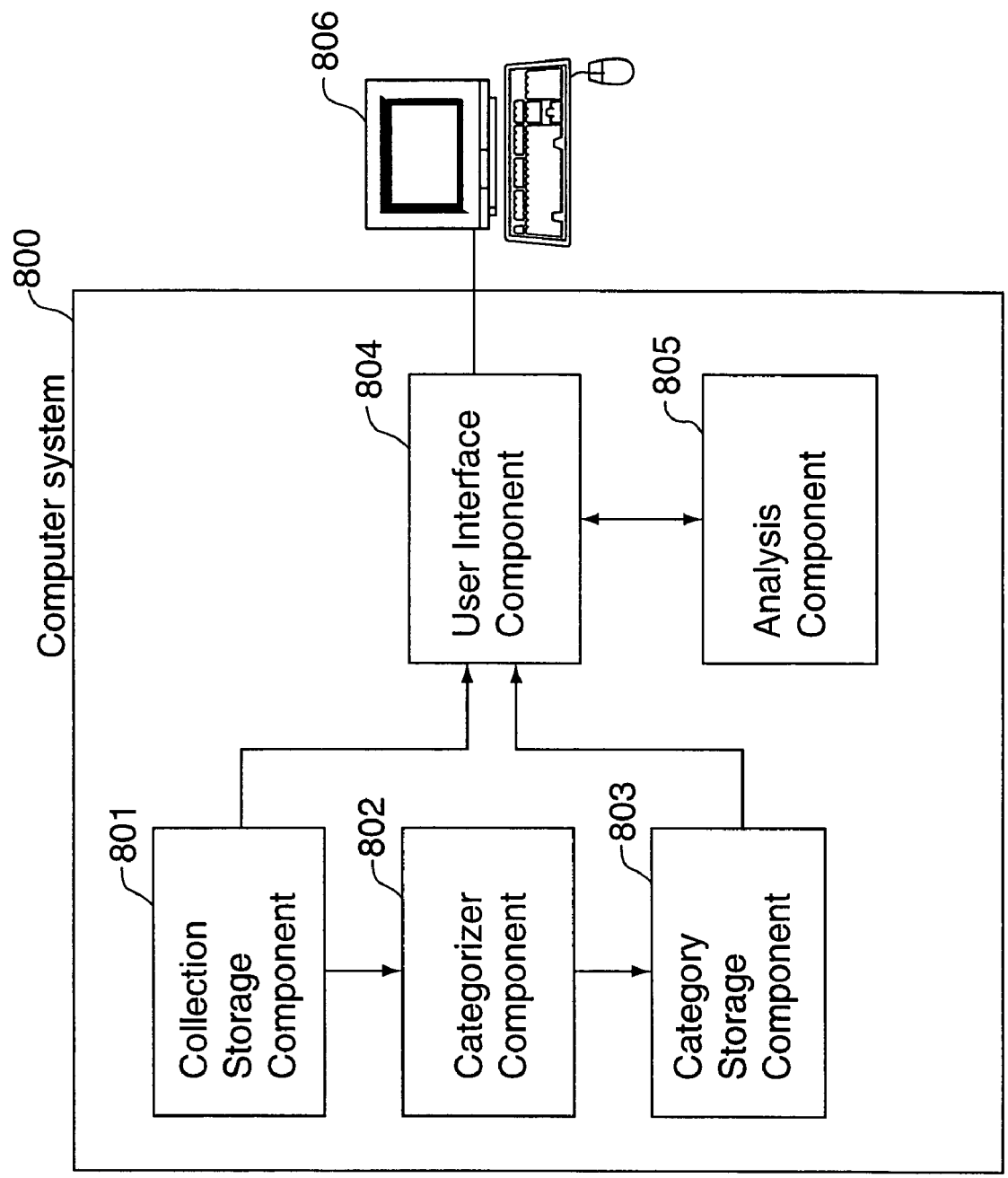
FIG. 8 depicts a high-level block diagram of computer system 800 for implementing one embodiment of the inventive category visualization system.

FIG. 8 depicts, in high level form, implementational components of the first embodiment of the inventive CV system.

As shown, the CV system executes on computer system 800 which includes a central processing unit, memory, and input/output devices. The CV system includes collection storage component 801, categorizer component 802, category storage component 803, user interface component 804 and analysis component 805. The collection storage component contains the attribute value for each attribute of each record in the collection. The categorizer component inputs the records of the collection storage component and identifies the various categories and stores the identification of the categories in the category storage component. The user interface component inputs data from the collection storage component and the category storage component and generates the various category graphs which are displayed on display 806. The user interface component invokes the analysis component to process the category storage information. The layout of the nodes can be determined by a variety of standard techniques for rendering graphs, including planar layouts, or any other scheme for minimizing edge crossings at display time.

Figure 9:
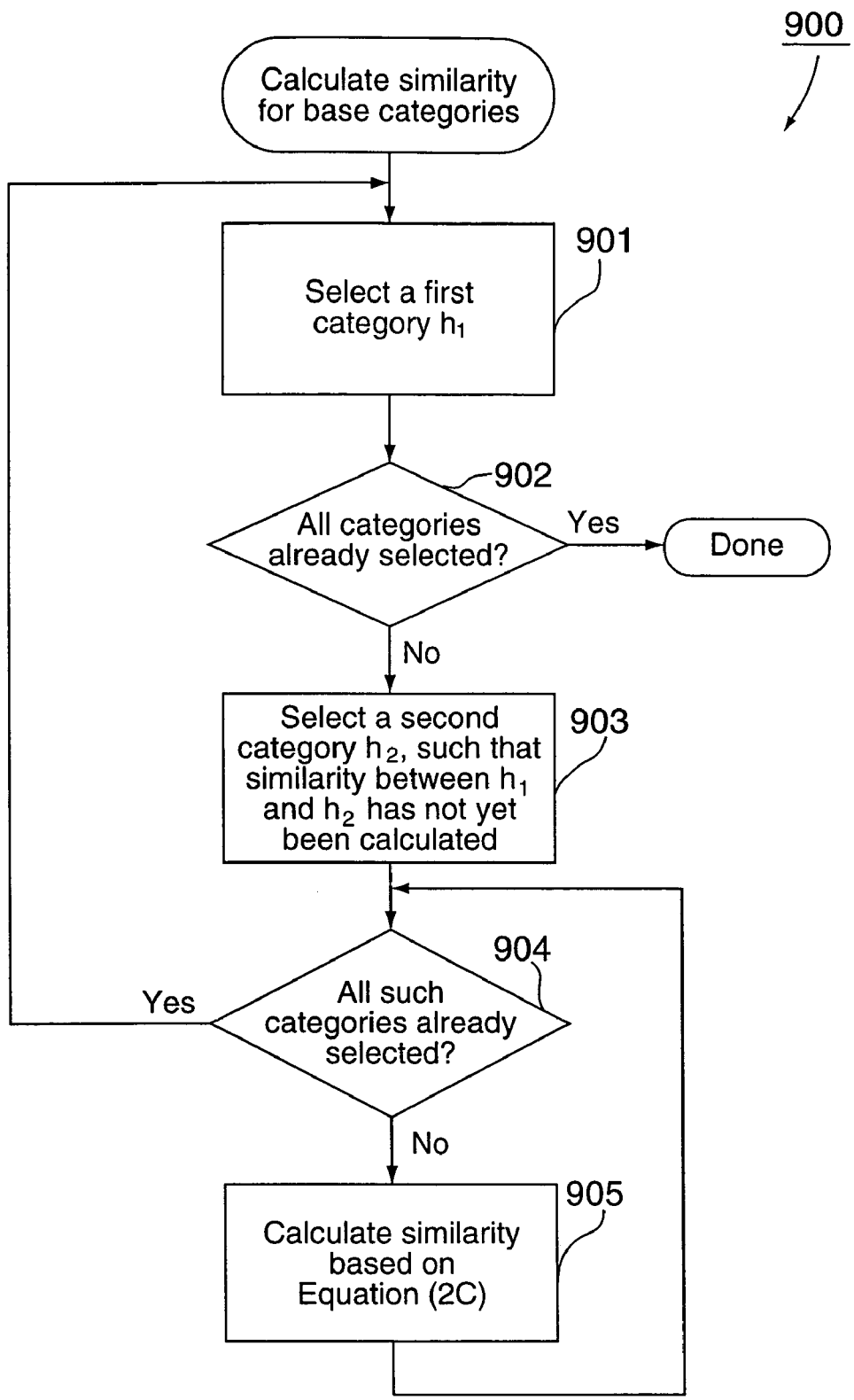
FIG. 9 depicts a flow diagram of routine 900, executed by computer system 800 shown in FIG. 8, for calculating similarity of base categories.

FIG. 9 depicts a flow diagram of routine 900, executed by computer system 800 shown in FIG. 8, for calculating the similarity of base categories.

This routine, implemented through looping, selects each possible pair of base categories and calculates the similarity in accordance with Equation (2c) or Equation (2b) without the independence assumption. Clearly, many other distances can be used for calculating the similarity of categories in lieu of that specified in either of these two equations. For example, one could use an average hamming distance between records in each category.

Specifically, through execution of step 901 shown in FIG. 9, routine 900 selects a first category $h_2$. In step 902, if all the categories have already been selected as the first category, routine 900 terminates, else the routine continues at step 903. In step 903, this routine selects a second category $h_2$ for which the similarity between the first and second categories has not yet been calculated. In step 904, if all such categories have already been selected, then routine 900 loops back to step 901 to select another first category, else the routine continues at step 905. In step 905, this routine calculates the similarity between the selected first and second categories and loops to step 903 to select another second category, and so forth.

Figure 10:
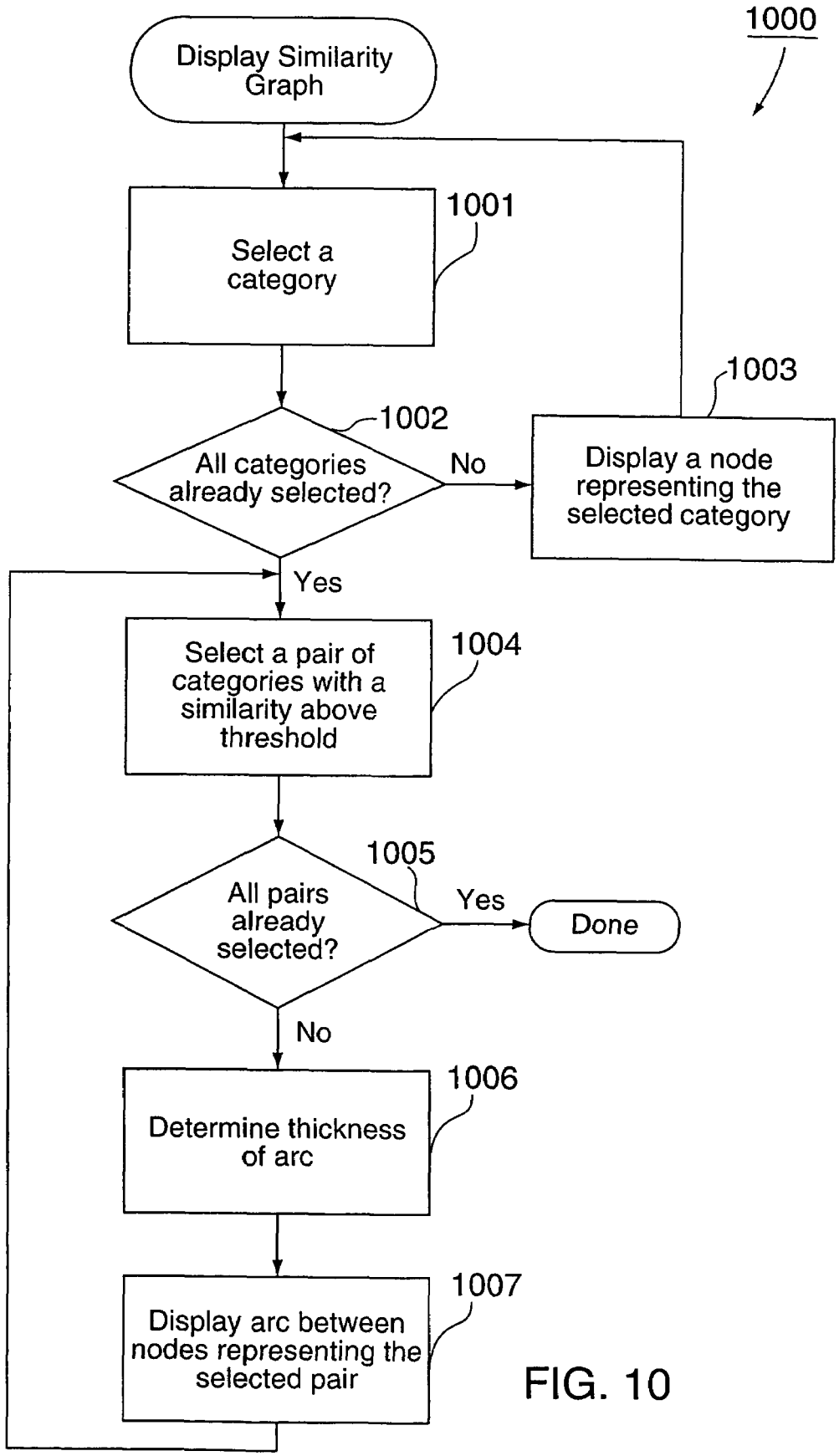
FIG. 10 depicts a flow diagram of routine 1000, executed by computer system 800 shown in FIG. 8, for displaying a similarity graph.

FIG. 10 depicts a flow diagram of routine 1000, executed by computer system 800 (shown in FIG. 8) for displaying a similarity graph.

In particular, routine 1000 (shown in FIG. 10) displays a node for each base category and then displays an arc between those nodes representing categories whose similarity is above the similarity threshold.

Specifically, through steps 1001-1003, routine 1000, using looping, displays nodes for the categories. In step 1001, the routine selects a category that has not yet been selected. In step 1002, if all the categories have already been selected, then routine 1000 continues at step 1004, else this routine continues at step 1003. In step 1003, routine 1000 displays a node representing the selected category and loops to step 1001 to select the next category. In steps 1004-1007, this routine loops displaying the arcs. In step 1004, the routine selects a pair of categories with a similarity above the similarity threshold. In step 1005, if all such pairs of categories have already been selected, then routine 1000 terminates, else this routine continues at step 1006. In step 1006, routine 1000 determines the thickness of the arc to be displayed between the selected pair of categories. In step 1007, the routine displays an arc of the determined thickness between the nodes representing the selected categories and loops to step 1004 to select another pair of categories.

Figure 11:
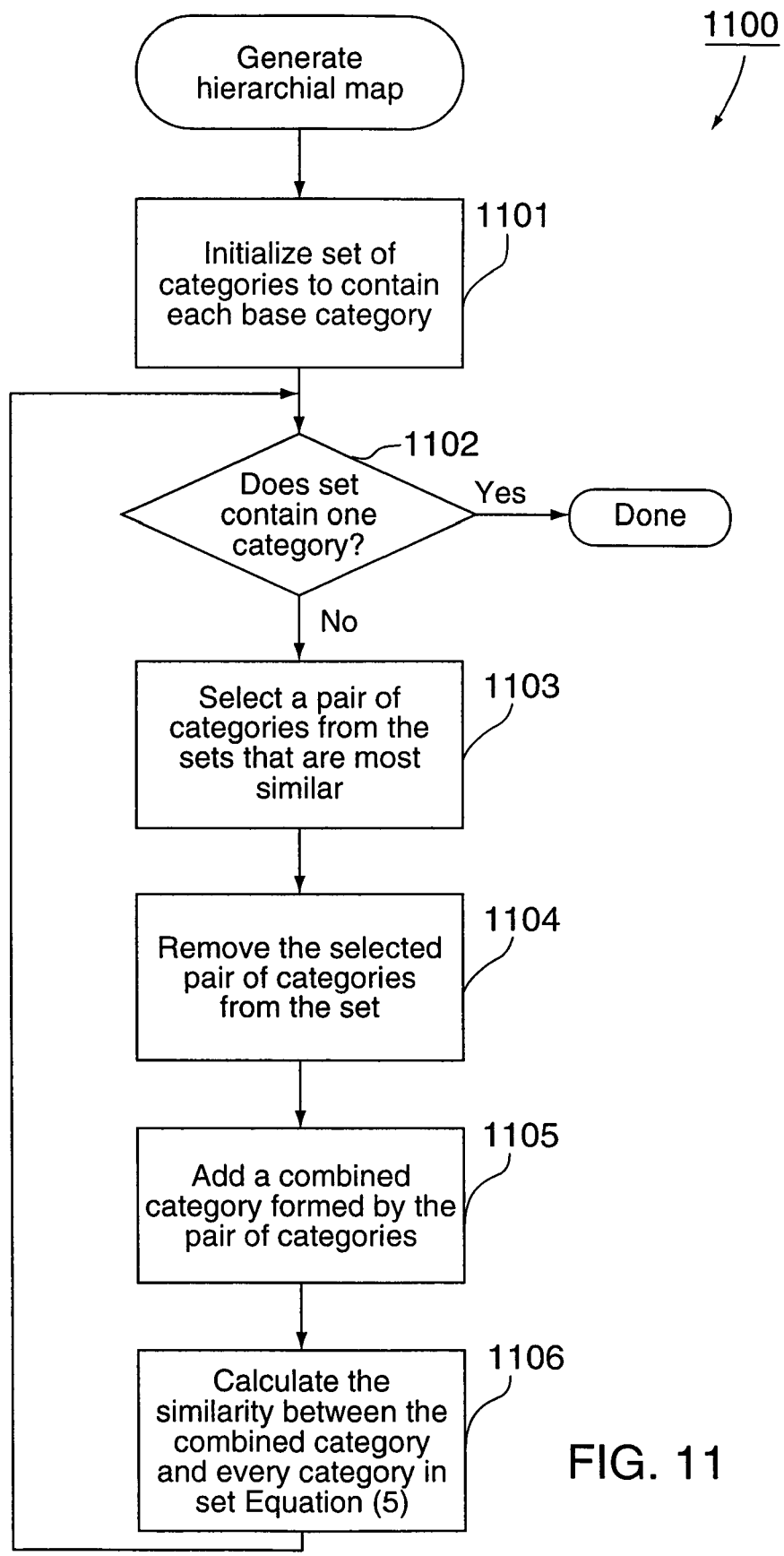
FIG. 11 depicts a flow diagram of routine 1100, executed by computer system 800 shown in FIG. 8, for generating a hierarchical map.

FIG. 11 depicts a flow diagram of routine 1100, executed by computer system 800 (see FIG. 8), for generating a hierarchical map.

As shown in FIG. 11, routine 1100 starts with the base categories and successively combines categories that are most similar. In step 1101, this routine initializes a set of categories to contain each base category. In step 1102, if the set contains only one category, then the hierarchical map is complete and routine 1100 simply terminates, else this routine continues at step 1103. In step 1103, this routine selects the next pair of categories in the set that are most similar. Initially, the similarities of the base categories are calculated in accordance with routine 900 shown in FIG. 9. Through step 1104 (see FIG. 11), routine 1100 removes the selected pair of categories from the set. In step 1105, routine 1100 adds a combined category formed by the selected pair of categories to the set. In step 1106, routine 1100 calculates the similarity between the combined category and every other category in the set according to Equation (5) and loops back to step 1102 to determine whether the set contains only one category.

Figure 12:
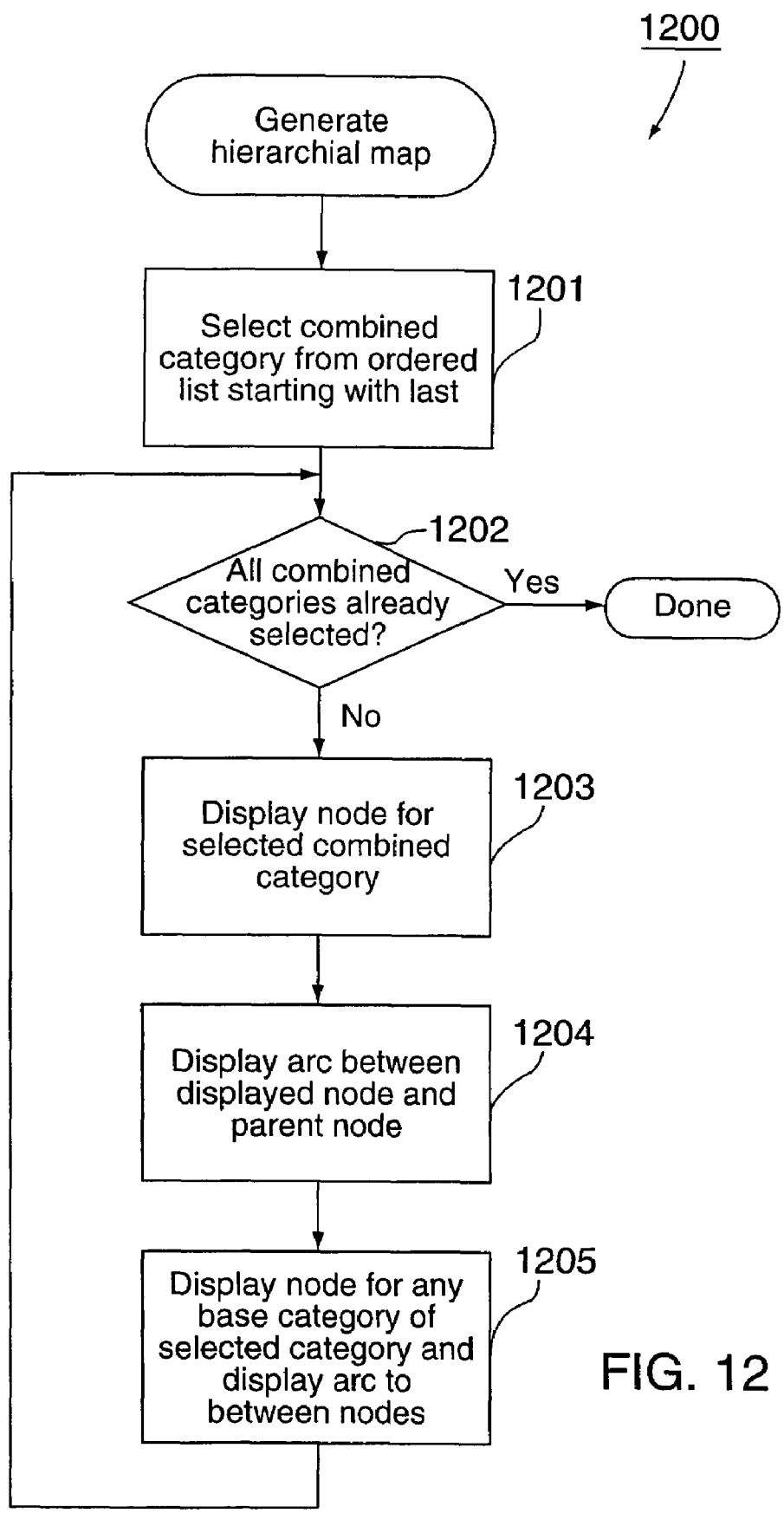
FIG. 12 depicts a flow diagram of routine 1200, executed by computer system 800 shown in FIG. 8, to display a hierarchical map.

FIG. 12 depicts a flow diagram of routine 1200, executed by computer system 800 (see FIG. 8), which displays a hierarchical map.

Specifically, as shown in FIG. 12, in step 1201, routine 1200 selects a combined category starting with the last combined category that was generated. In step 1202, if all the combined categories have already been selected, then routine 1200 terminates, else routine 1200 continues at step 1203. In step 1203, this routine displays a node representing the selected combined category. In step 1204, routine 1200 displays an arc between the displayed node and its parent node. In step 1205, this routine displays a node representing any base sub-category of the combined category along with connecting arcs. Routine 1200 then loops back to step 1201 to select the next combined category, and so forth.

Figure 13:
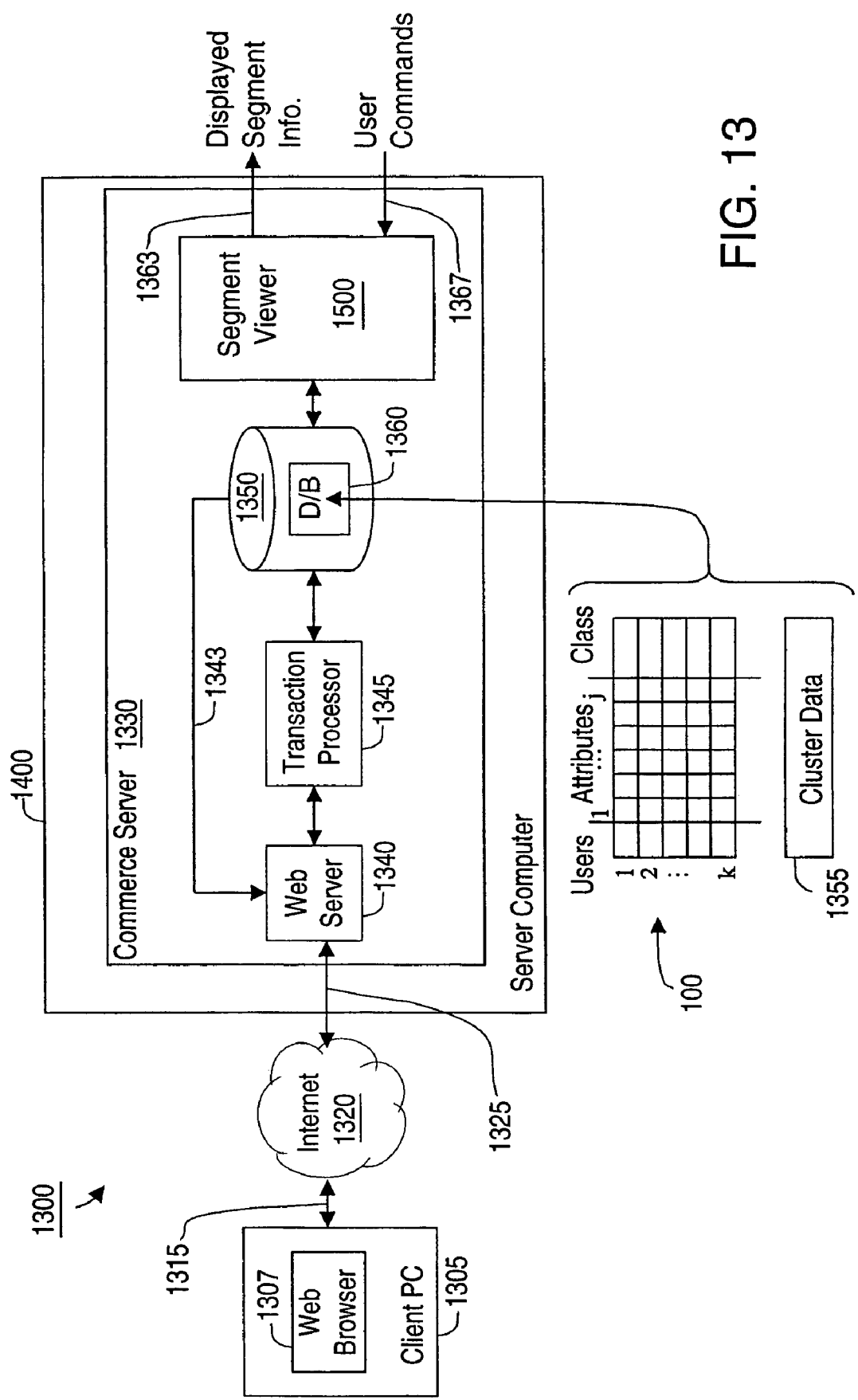
FIG. 13 depicts, at a very high level, a block diagram of networked system 1300, that implements a second embodiment of the present invention, to provide clustering, cluster summarization, segment scoring, segment comparison and interactive hierarchical display of segments of cases that illustratively occur in an Internet-based electronic commerce environment.

FIG. 13 depicts, at a very high level, a block diagram of networked system 1300, that implements a second embodiment of the present invention, to provide clustering, cluster summarization, segment scoring, segment comparison and interactive hierarchical display of segments of cases that illustratively occur in an Internet-based electronic commerce environment.

As shown, an Internet user stationed at client PC 1305 communicates through Internet 1320, via network connections 1315 and 1325, with server computer 1400 at a remote web site. This server implements, through Commerce Server system 1330, electronic commerce. Commerce Server system 1330 provides various functions that collectively implement infrastructure necessary to provide a comprehensive scalable, robust electronic business-to-business or business-to-consumer commerce web site; namely, user profiling, product cataloguing and content management, transaction processing, targeted marketing and merchandizing functionality, and analysis of consumer buying activities. These functions are provided, within system 1330, through web server 1340, transaction processor 1345, store 1350, which contains database 1360, and segment viewer 1500. Web server 1340 directly interacts, via Internet 1320 and network connections 1315 and 1325, with web browser 1307 situated within client PC 1307. Server 1340, as instructed by web browser 1307, downloads appropriate HTML web pages, stored in illustratively store 1350 (typically hard disk storage) and as symbolized by line 1343, to the browser for local display to the user situated at the client PC. This server also obtains responding cgi (common gateway interchange) messages sent by the browser and containing user-provided information of one sort or another in response to any of the displayed pages. Web server 1340 also specifies the pages accessed by the user to transaction processor 1345 and provides the transaction processor with the cgi responding messages it receives from the client PC. The transaction processor appropriately processes each transaction initiated by the user. In addition, the transaction processor updates database 1360 (also known as a "data warehouse") situate within store 1350 to reflect each user that visited the site served by server 1340, which may include not only those that completed a transaction, including storing the transaction details, but also those that did not, as well as with any user information (such as age, gender, income, preferences, etc.) entered by that user in response to a web page provided by server 1340. For each such user, database 1360 contains dataset 100 that contains a record for each such user along with predefined attributes (illustratively numbered 1 through j) for that user, and the class (category or cluster) to which that record is categorized. As noted, each such record together with all its attributes is commonly referred to as a "case". In addition, database 1360 also contains cluster data 1355 which specifies, e.g., clusters, segment and segment hierarchies.

In accordance with our invention, segment viewer 1500, which operates on case and cluster data stored within database 1360, automatically generates appropriate clusters of cases and associated segments; and in response to user commands provided over line 1367 from a user, such as a business manager or data analyst that accesses commerce server 1330, compares user selected segments, and generates, on line 1363, a graphical display, based on calculated scored similarity values, of segment hierarchy. Segments are clusters of cases that exhibit similar behavior, such as users on a given site, and have similar properties, such as age or gender. A segment consists of a summary of the database records (cases) that belong to it. The summary, for which a mathematical basis is described hereinbelow, is derived from properties in database 1360. Segment groups are collections of similar segments or other segment groups.

Furthermore, in accordance with our inventive teachings, similar segment groups can be merged together to form higher-level segment groups, with this operation iteratively continuing until a single, high-level segment group is formed representing all the cases in a dataset (an entire population). The segment groups form a hierarchy from which a user, such as a business manager or data analyst, can analyze trends and discover correlations within the case data at different levels of the segment hierarchy. Segment viewer 1500 graphically presents segments in hierarchical order, with a top-level segment group summarizing the entire population and lower-level groups and segments summarizing smaller and smaller subsets of the population. A percentage of the entire population contained within any given segment is also displayed in parentheses after a segment name.

Viewer 1500 also permits, through the commands received over line 1367, the segment hierarchy to be expanded or contracted to facilitate understanding the depicted relationships among the displayed clusters. Further, viewer 1500 also scores the displayed segments, based on similarity measures, and ranks and displays those segments based on normalized scores.

Figure 18:
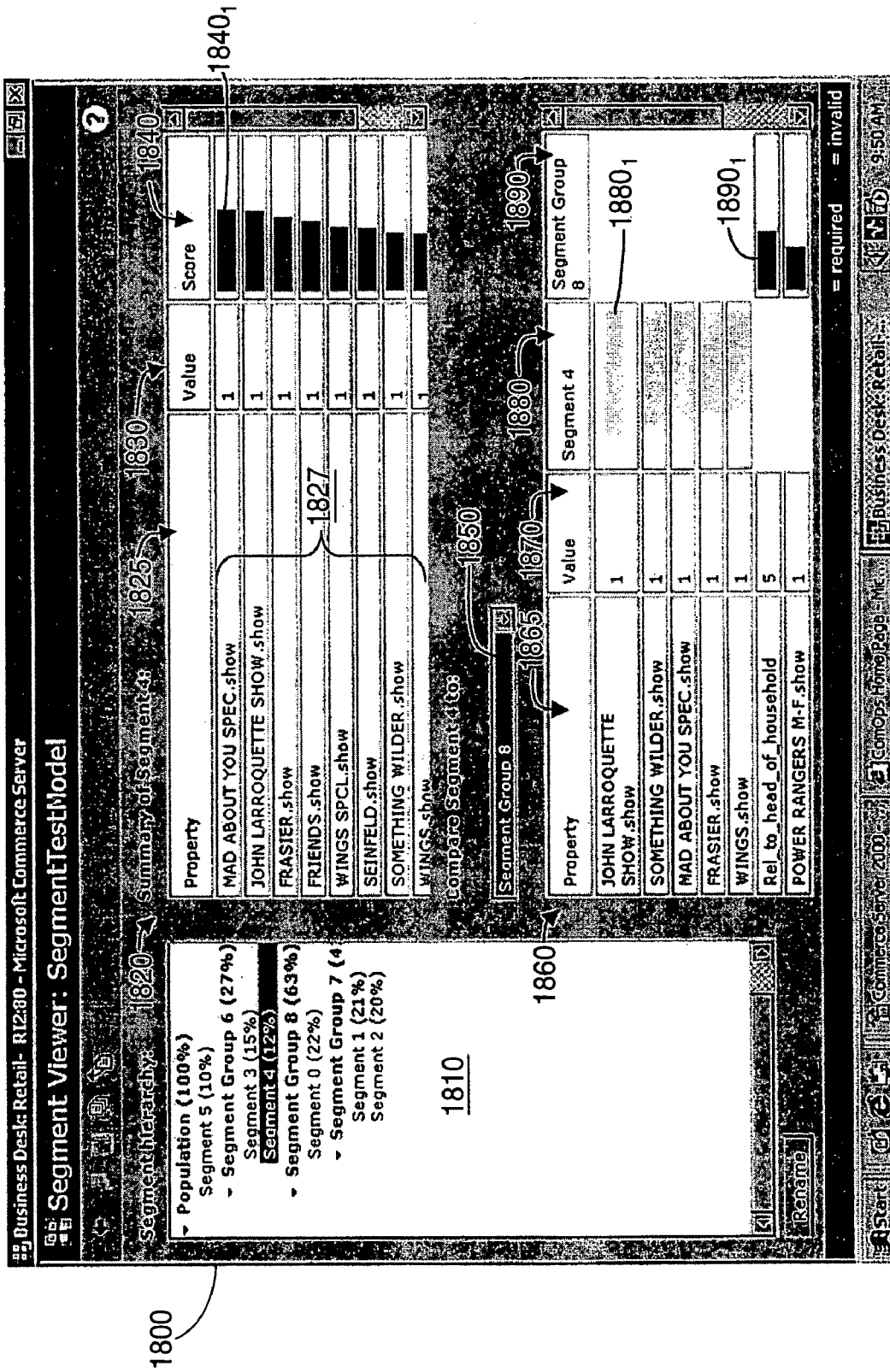
FIG. 18 depicts illustrative graphical display 1800, that provides hierarchical information, attribute value and normalized scoring, as provided by segment viewer 1500, shown in FIG. 15, and in accordance with the second embodiment of the present invention as a result of comparing two segments in an exemplary collection of case data.

FIG. 18 depicts illustrative graphical display 1800 provided by segment viewer 1500 for exemplary case data, here illustratively being "Nielsen" television show ratings for a collection of previously aired television shows rather than e-commerce data (though e-commerce data would be very similarly displayed). Display 1800 shows segment hierarchy 1810 in a left portion of the display. A user, such as a business manager or data analyst, by clicking on a down arrow displayed within hierarchy 1810 can expand a segment group to expose its constituent segments, as shown. Each segment and group are listed along with their corresponding percentages of an entire population. In that regard, segment 5 represents 10% of the entire population, segment group 6 represents 27% of the entire population, and so forth. As depicted, segment group 6 also contains segments 3 and 4. In the absence of specifically naming any segment or group, segment viewer 1500 assigns generic names, such as segment 1, segment 2 and so forth, to the various segments. If a user selects a particular segment, here segment 4, in the hierarchy—that selection being signified by a black background, segment viewer will display summary 1820 of the selected segment in an upper right portion of the display. Summary 1820 contains a table having various columns of displayed data. Property (attribute) column 1825 which lists various attributes 1827 for the cases in the segment; value column 1830 provides the value of each of those attributes. The property/value pairs that are displayed are those that best summarize, in ranked order, the cases in the selected segment or segment group, here segment 4. Here, for the cases in segment 4, the property/value pair indicative of users who watched (attribute value=1; this value would equal zero for those that did not watch) the television show "MAD ABOUT YOU SPECIAL" best characterizes segment 4, followed by other property/value pairs accordingly. Score column 1840 provides a bar, such as bar $1840_1$, the length of which is a relative (normalized) indicator of just how well the property/value pair summarizes the cases in the selected segment or segment group. the longest length bar specifies the corresponding property/value that best summarizes the category. As illustratively shown in summary 1820, the top two entries appear to summarize, on an approximately equal basis, the cases that form segment 4.

Through our present invention, a user of segment viewer 1500 can compare two segments or segment groups. In the context of electronic commerce, illustratively, one segment may correspond to those users who frequently visited a site implemented by Commerce Server 1330 (see FIG. 13), while another group may those user who infrequently visit that same site. With a given segment, here being segment 4, being selected by a user of segment viewer 1500, that user, through selection through use of pull down menu 1850, can select any other segment (or segment group) in the hierarchy to compare against the previously selected category. In the context of exemplary display 1800 shown in FIG. 18, the user, having selected segment 4 for display, has then selected segment group 8 to compare, as a comparison segment or segment group, against segment 4. Here, segment group 8 comprises one segment (segment 0) which contains another cluster of television viewers, though characterized by having, in some respects, preferred television programs in a slightly different order than that of segment 4. Once a segment is chosen for comparison that segment is shown in comparison area 1860. Area 1860 is also formed of a table which in column 1865 lists the attributes (properties) of that segment and in column 1870 the values of those attributes. These property/value pairs, as with summary 1820, are those that best summarize the selected segment or segment group for comparison, here segment group 8. Columns 1880 and 1890 provide visual, ranked, normalized results of that comparison through the use of displayed bar indicators. Specifically, the bars in column 1880, of which bar $1880_1$ is illustrative, indicate those attributes that which tend to favor the selected segment or segment group, with the length of each such bar indicating a relative degree to which a corresponding property/value pair, is likely to be seen more in the selected segment or segment group, here segment 4, than in the comparison segment or segment group, here segment group 8. Of the attributes shown, the property/value pair (user who watched the "JOHN LARROQUETTE SHOW") having the longest bar in column 1880, i.e., bar $1880_1$, most favors the selected segment or segment group, i.e., segment 4. Correlatively, the bars in column 1890, of which bar $1890_1$ is illustrative, indicate those attributes that which tend to favor the comparison segment or segment group, with the length of each such bar indicating a relative degree to which a corresponding property/value pair, is likely to be seen more in the comparison segment or segment group, here segment 8, than in the selected segment or segment group, here segment 4. Of the attributes shown, the property/value pair (users that specify they are part of a family unit of 5 people "related to the head of household") having the longest bar in column 1890, i.e., bar $1890_1$, most favors the comparison segment or segment group, i.e., segment group 8.

Since only the cluster visualization aspect, i.e., the system components that form segment viewer 1500 and produce display 1800, is germane to the present invention, we will omit any further discussion of any of the other functionality provided by Commerce Server system 1330.

Figure 14:
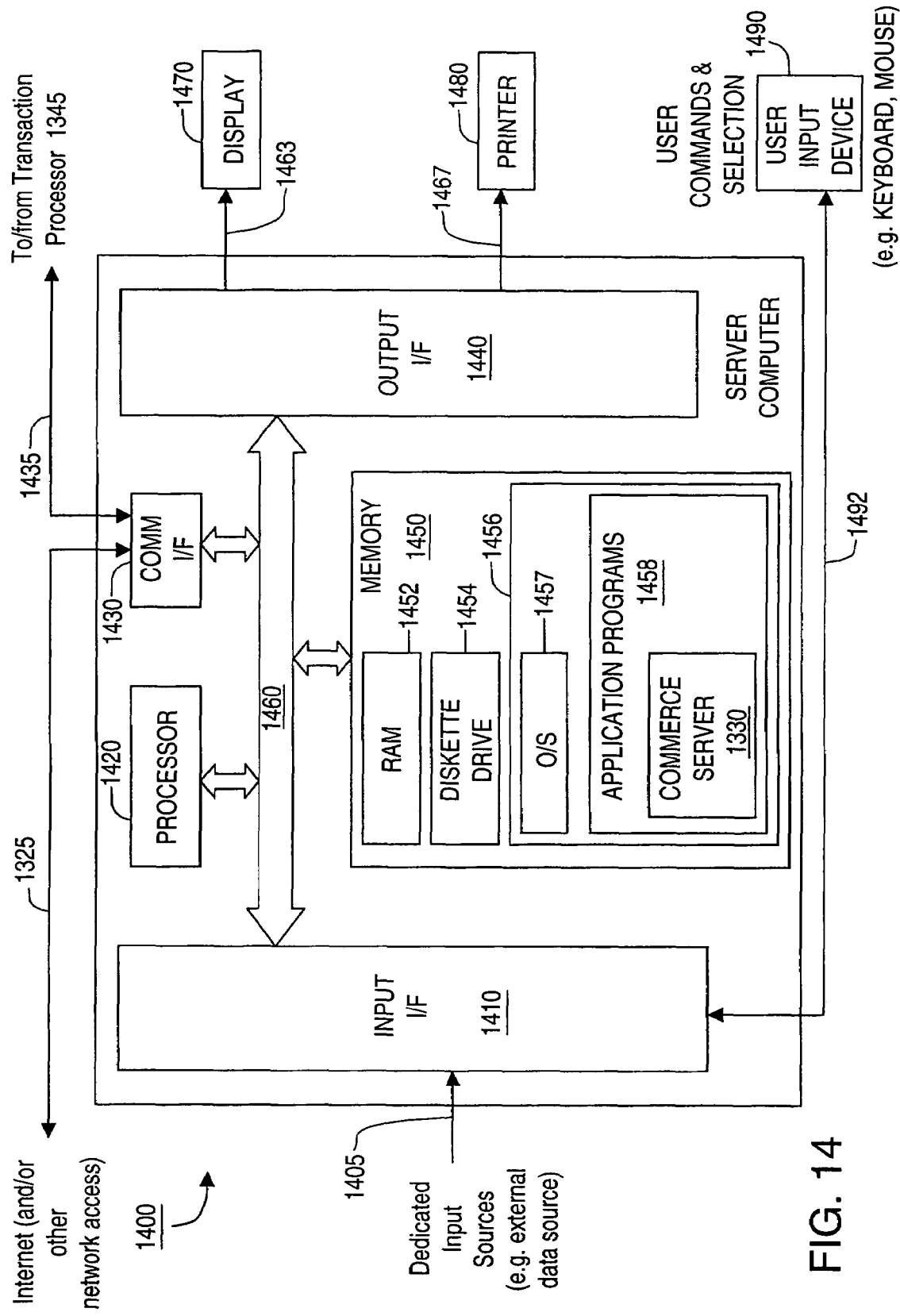
FIG. 14 depicts a block diagram of server computer 1400 that forms a portion of networked system 1300 shown in FIG. 13.

FIG. 14 depicts a block diagram of server computer 1400 that forms a portion of networked system 1300 shown in FIG. 13.

As shown in FIG. 14, server computer 1400, at a high level, comprises input interfaces (I/F) 1410, processor 1420, communications interfaces 1430, memory 1450 and output interfaces 1440, all conventionally interconnected by bus 1460. Memory 1450, which generally includes different modalities, such as illustratively: random access memory (RAM) 1452 for temporary data and instruction store; diskette drive(s) 1454 for exchanging information, as per user command, with floppy diskettes; and non-volatile mass store 1456 that is implemented through a hard disk(s), typically magnetic in nature. Mass store 1456 also stores executable instructions and associated data for server operating system (O/S) 1457 and application programs 1458. Programs 1458 include Commerce Server system 1330. O/S 1457 may be implemented by a conventional server operating system, such as the WINDOWS 2000 Server operating system commercially available from Microsoft Corporation of Redmond, Wash. ("WINDOWS 2000" is a trademark of Microsoft Corporation). Given that, we will not discuss any components of O/S 1457 as they are all irrelevant. Suffice it to say, that Commerce Server system 1330, being one of application programs 1458, executes under control of the O/S.

Incoming information can arise from two illustrative external sources: network supplied information, from the Internet (and/or other networked facility) through network connection 1325 to communications interfaces 1430, or from a dedicated input source, via path(es) 1405, to input interfaces 1410. Dedicated input can originate from a wide variety of data sources, none of which is particularly relevant here.

Input interfaces 1410 contain appropriate circuitry to provide necessary and corresponding electrical connections required to physically connect and interface each differing dedicated source of input information to server computer 1400. Under control of the operating system, application programs 1458 exchange commands and data with the external sources, such as web browser 1305 in client PC 1307 (see FIG. 13), via network connection 1325 or path(es) 1405, to transmit and receive information typically requested during program execution at the server. In addition, server computer 1400 communicates, via communication interfaces 1430 and communications link 1435, which may constitute, e.g., a link to a local area network, with transaction processor 1345 (see FIG. 13).

Furthermore, input interfaces 1410 also electrically connect and interface user input device 1490, such as a keyboard and mouse, to server computer 1400. Display 1470, such as a conventional color monitor, and printer 1480, such as a conventional laser printer, are connected, via leads 1463 and 1467, respectively, to output interfaces 1440. The output interfaces provide requisite circuitry to electrically connect and interface the display and printer to the computer system. Through use of printer 1480, a user, e.g., data analyst or business manager, who can access the server computer can generate local hardcopy reports. Alternatively, this printer can be situated on, e.g., a local area network (not shown) to which server computer 1400 is also connected, via communication interfaces 1430.

Since the specific hardware components of server computer 1400 as well as all aspects of the software stored within memory 1456, apart from the modules that implement the present invention, are conventional and well-known, they will not be discussed in any further detail. Generally speaking, client PC 1305 has an architecture that is similar, at the high level depicted in FIG. 14, to that of server computer 1400.

With this in mind, we will now turn to discussing the components of segment viewer 1500 and then provide the mathematical basis which underlies the hierarchical tree construction, segment summary, comparison and scoring operations performed by the segment viewer.

Figure 15:
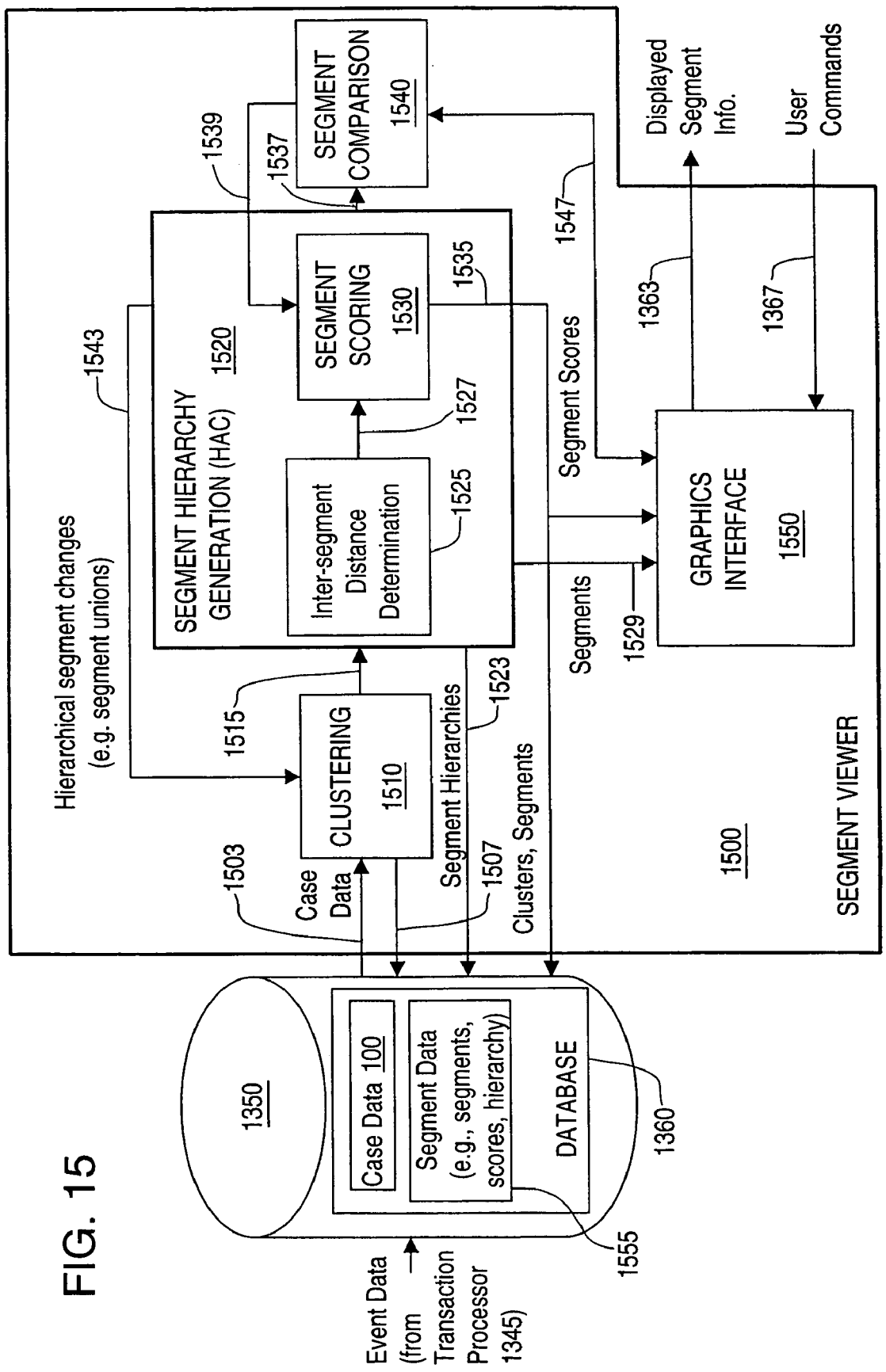
FIG. 15 depicts a block diagram of segment viewer 1500 that illustratively executes within server computer 1400 to implement the second embodiment of the present invention.

FIG. 15 depicts a block diagram of segment viewer 1500.

As shown, the segment viewer contains clustering process 1510, cluster hierarchy generation process 1520 which contains inter-segment distance determination process 1525 and segment scoring process 1530; segment comparison process 1540 and graphics interface 1550; and operates in conjunction with data stored within database 1360 residing in store 1350. Specifically, transaction processor 1345 writes event data into database 1360. This data, in conjunction with its attributes, forms case data 100. As noted, data for each event together with its attributes forms a separate record (case) within the database, and specifically within case data 100.

Clustering process 1510 automatically, and using a conventional clustering process, such as "EM" clustering, reads, as symbolized by lines 1503, data for the cases, in a dataset (population or collection) stored within case data 100 and automatically determines applicable mutually exclusive categories for these cases and then categorizes (classifies) each of those cases into those categories. This process stores the category for each case within case data 100 and specifically within a field associated with each corresponding record. As each case is categorized, i.e., placed into a corresponding cluster, process 1510 also forms a segment for each ensuing cluster. Alternatively, process 1520, rather than clustering process 1510, may form a segment from a corresponding cluster. As previously noted, a segment is a cluster of cases (having one or more cases) that exhibit similar behavior and have similar properties, and consists of a summary of the case(s) that belong to it. Process 1510 then stores, as symbolized by line 1507, the cluster and segment data, as data 1555, within database 1360.

Cluster hierarchy generation process 1520 determines inter-segment similarity, scores the similarity measures and implements hierarchical agglomerative clustering (HAC). In particular, similarity between each pair of segments is mathematically determined through inter-segment distances calculated by inter-segment distance determination process 1525; the mathematical details of which will be specifically addressed later.

Segment hierarchies are then formed based on scored similarity measures. To do so, process 1520 first considers all segments to be located at a common lowest hierarchical level and then automatically and selectively merges the segments, based on their scored similarity measures, through hierarchical agglomerative clustering to form a segment hierarchy. In particular, the segment similarity measures determined through distance determination process 1525 are applied, as symbolized by line 1527, to segment scoring process 1530 which, in turn, scores each segment (or segment group), here too the specific mathematical details of the scoring will be discussed later.

Thereafter, process 1520 then causes those segments that have the closest similarity measures to be merged together to form a next higher-level group. To do this, process 1520 instructs, as symbolized by line 1543, clustering process 1510 to re-cluster those segments into a single segment group and apply the results, as symbolized by line 1515 back to process 1520. Process 1520 then calculates, through distance determination process 1525, the similarity between this new segment group and all the remaining segments. This HAC operation iteratively continues until a single, high-level segment group, i.e., a root node, is formed that represents all the cases in the entire data population. HAC can be readily understood by defining as "horizon" (cluster set) and how HAC changes that horizon. Initially, all singleton clusters reside in a current horizon. After merging any two nodes in that horizon into a merged node, the merged node is added to the horizon and the two original, now merged, nodes are removed. Hence, the only pairs of nodes that are eligible for merging are those then remaining in the horizon.

As symbolized by line 1535, segment scoring process 1530 writes the scores of all segments and segment groups within data 1555 situated within database 1360. Once this process is completed, segment and segment group information is provided to graphics interface 1550 which forms a graphical display, of the form illustratively given by display 1800 shown in FIG. 18, that visually depicts the segment hierarchy.

Once the hierarchy has been established and displayed, a user of segment viewer 1500 can compare two segments or segment groups. To do so, the user selects a segment through appropriate interaction with the displayed graphical interface provided by process 1550. In response to user commands on line 1367 that specify such a selection, process 1550, as symbolized by line 1547, identifies both the selected segment or segment group and the comparison segment or segment group to segment comparison process 1540. As symbolized by line 1539, comparison process 1540 specifies the segments or segment groups to be compared to segment scoring process 1530. Process 1530, in turn, causes segment hierarchy generation process 1520 to provide data for these segments and segment groups, including summarized data, as symbolized by line 1529, to graphics interface process 1550 for display, within display 1800 as shown in FIG. 18, as selected segment/segment group 1820 (specifically paired attributes/values in columns 1825 and 1830, and normalized ranked scores in column 1840) and as comparison segment/segment group 1860 (specifically paired attributes/values in columns 1865 and 1870). In addition, process 1520, as shown in FIG. 15, provides normalized scores for those segments and/or segment groups, as symbolized by line 1537, back to segment comparison process 1540. With this scoring information, comparison process 1540 compares the two selected and comparison segments and/or segment groups against each other with the results of that comparison being passed, also symbolized by line 1547, to graphics interface 1550 for graphical display (as columns 1880 and 1890 in display 1800 shown in FIG. 18). Graphics interface 1550 provides appropriate data and instructions, as symbolized by line 1363, to O/S 1457 (see FIG. 14) to generate visualized display 1800 on a monitor (not shown).

As noted, through graphics interface 1550, the user of segment viewer 1500 can selectively expand or contract the displayed hierarchy to gain a better appreciation of the inter-relationships among the individual segments and segment groups that occupy the hierarchy.

Furthermore, as noted above, some clustering distinctions, which are the product of mathematical clustering techniques, may be rather fine-grained from a quantitative perspective but are essentially meaningless, from a qualitative standpoint; hence, yielding an excessive number of segments. As such, the invention, through HAC process 1520 automatically and dynamically changes the hierarchy by eliminating appropriate numbers of node(s) and inter-segment links to reduce the number of levels (depth) in the hierarchy.

Figure 16:
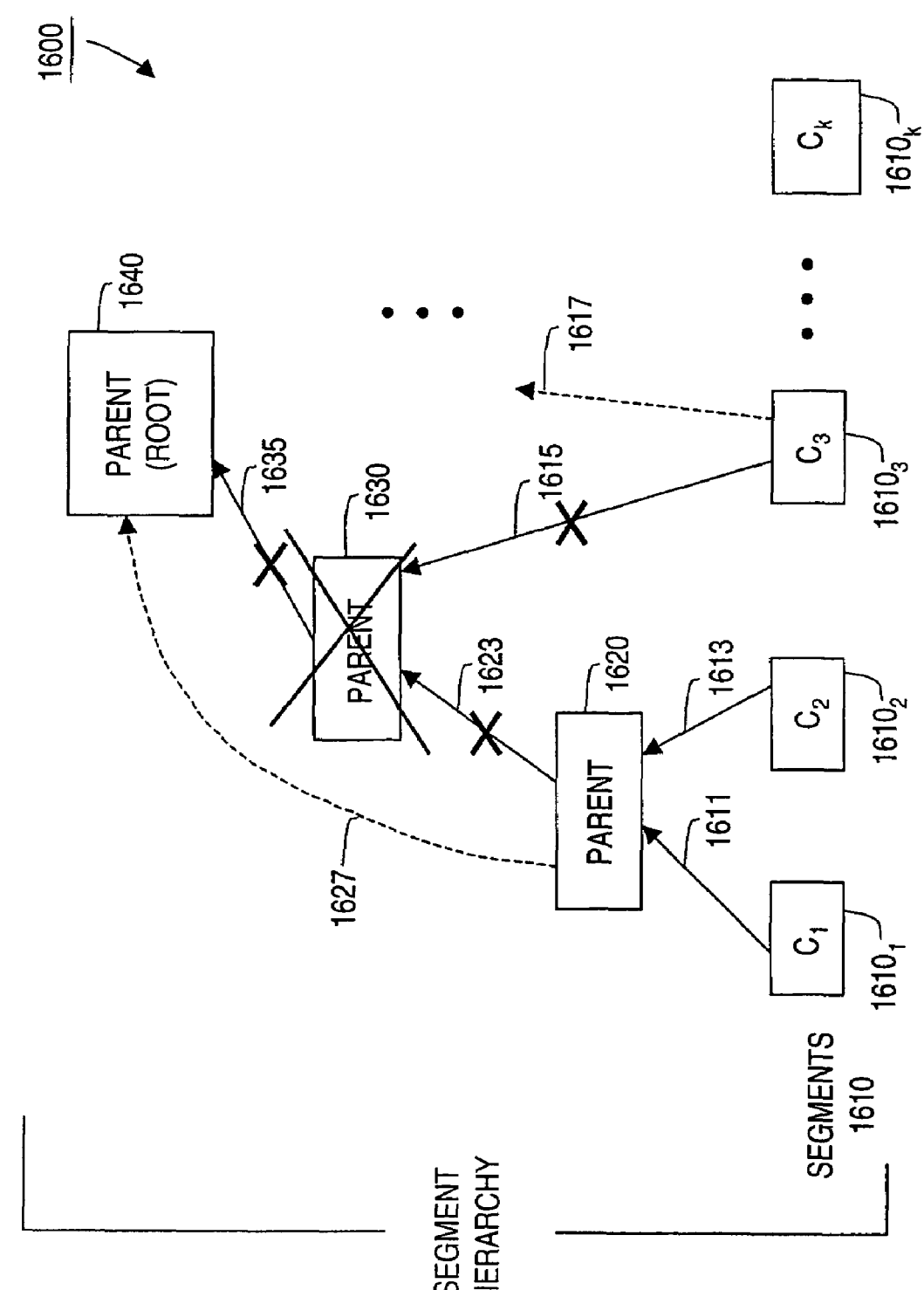
FIG. 16 depicts an illustrative, though graphical, example of hierarchical level reduction as provided by the second embodiment of the present invention.

To appreciate this feature, consider FIG. 16 which depicts an illustrative, though graphical, example of hierarchical level reduction provided through the present invention. Assume for the moment that a data population has been categorized into segments 1610 formed of k individual segments: $C_1, C_2, \ldots, C_k$ being represented by leaf nodes $1610_1, 1610_2, 1610_3, \ldots, 1610_k$, respectively. As a result of HAC, a four-level segment hierarchy represented by tree 1600 results. Further, suppose that the tree is deeper, i.e., has an excess number of levels, than desired. This could be caused by one or more segments situated at intermediate levels in the hierarchy that represent unnecessary or immaterial distinctions. For example, in Commerce Server 1330, displayed hierarchical segment trees are limited, to simplify understanding, to a depth of three levels. If a resulting tree produced through HAC contains more than three levels, certain levels need to be removed and the tree appropriately re-arranged. Such is the situation illustratively shown in FIG. 16.

The segment group of each parent node in tree 1600 is formed, through HAC, as a result of the union of the segments or segment groups associated with the two nodes situated immediately below it. The latter two nodes are viewed as child nodes, the child nodes situated to the lower left and right of a parent node, such as nodes $1610_1$ and $1610_2$, respectively, for parent node 1620 are correspondingly referred to as left and right child nodes. Hence, as symbolized by inter-nodal links 1611 and 1613, segments $C_1$ and $C_2$ (associated with nodes $1610_1$ and $1610_2$, respectively) have been merged through HAC to form parent node 1620. Parent node 1630 has been illustratively formed through HAC by merging, as represented by inter-nodal links 1623 and 1615, segment group associated with parent node 1620 and segment $C_3$ associated with node $1610_3$. Root node 1640 has been formed, at least in part, through the merger, as symbolized by inter-nodal link 1635, of the segment group associated with parent node 1630. In order to convert four-level tree 1600 to its proper size of three levels, node(s) at one level and associated inter-nodal links must be removed; hence, segment and segment groups associated with those nodes merged into parent nodes at a next higher level, with the hierarchy being re-arranged accordingly.

To determine which nodes to remove, the distances between the segments associated with the child nodes (e.g., nodes $1610_1$ and $1610_2$ for segments $C_1$ and $C_2$, respectively) for the first level of parent nodes are first determined.

Then, the score for the second level of parent nodes (e.g., node 1630) is similarly determined based on its child nodes. After scores for two parent levels are so determined, the parent nodes with maximum scores are deleted. Links are connected between the child nodes of each removed parent node and the remaining node situated above the deleted parent node. For example, as shown in FIG. 16, assume parent node 1630 is to be removed. In this case, inter-nodal links 1623 and 1615 from its child nodes 1620 and $1610_3$ are deleted from the hierarchy as is inter-nodal link 1635 from deleted noted 1630 to its parent (root) node 1640. Root node 1640 is then connected, via new inter-nodal link 1627, to parent node 1620. Child node $1610_3$ is then connected to its appropriate remaining parent node (not shown) by new inter-nodal link 1617. This process continues until the tree becomes the proper depth; though for the example shown in FIG. 16 this process occurs just once to reduce the tree by just one level. Once appropriate level(s) are eliminated in the tree, the similarity measures for all remaining nodes are updated through a weighted average, as given by Equation (18) below, of the updated distances associated with its child nodes.

Having now described the implementational and associated display aspects of segment viewer 1500, we will now describe the specific mathematical basis which underlies the various operations performed by the segment viewer. The basis will be separately described for each of the basic operations provided by the segment viewer: segment tree construction, segment set summary and segment set comparison. We will then provide a mathematical basis for our inventive alternate discriminant-based scoring technique.

First, assume each case has n attributes.

A. Hierarchical Tree Construction

Given a set of segments $C_1, C_2, \ldots, C_k$ and desired tree depth t, a hierarchical tree is constructed on top of these k segments as follows:

1. Construct an initial tree of arbitrary depth on top of segments $C_1, \ldots, C_k$ via Hierarchical Agglomerative Clustering (HAC).

a. Compute distance, $d_{clust}$, between every pair of segments as follows:

$$d_{clust}(C_i, C_h) = \sum_{j=1}^{n} d_j(C_{i,j}, C_{h,j}) \tag{8}$$

where: $d_j(C_{i,j}, C_{h,j})$ is the distance between the distributions modeling attribute j in clusters i and h, respectively.

If attribute j is modeled as BinGaussian, BinMultinomial or Binomial distribution, then:

$$d_j(C_{i,j}, C_{h,j}) = KL(p(x_j \neq NULL | C_i), p(x_j \neq NULL | C_h)) + \tag{9}$$
$$KL(p(x_j = NULL | C_i), p(x_j = NULL | C_h))$$

where: KL is computed through Equation (10) as follows (assuming $p_1 > p_2$):

$$KL(p_1, p_2) = (p_1 - p_2) \log(p_1/p_2) \tag{10}$$

Alternatively, if attribute j is modeled as a Gaussian distribution, which can occur if the attribute is "age" of an Internet site user, then:

$$d_j(C_{i,j}, C_{h,j}) = KL(p(x_j=\text{NULL}|C_i), p(x_j=\text{NULL}|C_h))0.5 \\ (KL(p_{11},p_{12}) + KL(p_{21},p_{22})) \quad (11)$$

where: $\mu^i_j$, $\sigma^i_j$ are mean and standard deviation of attribute j in cluster $C_i$, respectively; and $\mu^h_j$, $\sigma^h_j$ are mean and standard deviation of attribute j in cluster $C_h$, respectively.

Here, null represents no available data for an attribute for a given user, e.g., "no response" provided by that user to a question in a site that requests his(her) age.

The values $p_{1i}$, $p_{1h}$, $p_{2i}$, $p_{2h}$ are given by the following Equations (12-15):

$$p_{11} = p(x_j \ne NULL | C_i) \left[ \int_{-1}^{1} G(t; 0, 1) dt \right] \quad (12)$$

$$= p(x_j \ne NULL | C_i)(0.685).$$

Here, G(t;0,1) is a value of a normal Gaussian function (with mean=0, and standard deviation=1) at t.

$$p_{12} = p(x_j \ne NULL | C_h) \left[ \int_{((\mu^i_j - \sigma^i_j) - \mu^h_j)/\sigma^h_j}^{((\mu^i_j + \sigma^i_j) - \mu^h_j)/\sigma^h_j} G(t; 0, 1) dt \right] \quad (13)$$

$$p_{21} = p(x_j \ne NULL | C_h)(0.685) \quad (14)$$

$$p_{22} = p(x_j \ne NULL | C_i) \left[ \int_{((\mu^h_j - \sigma^h_j) - \mu^i_j)/\sigma^i_j}^{((\mu^h_j + \sigma^h_j) - \mu^i_j)/\sigma^i_j} G(t; 0, 1) dt \right] \quad (15)$$

Figure 17:
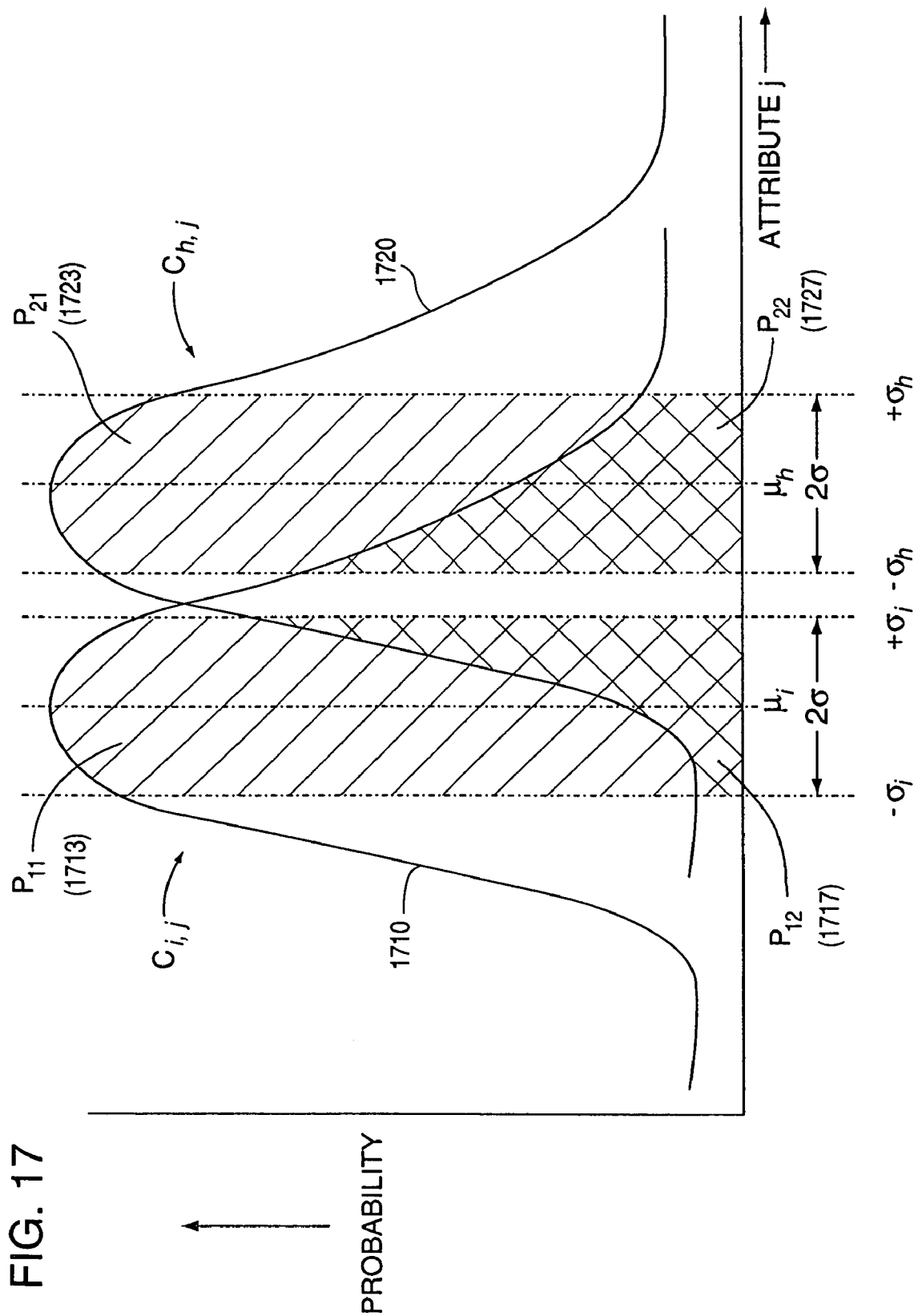
FIG. 17 depicts two illustrative Gaussian probability density functions for continuous-valued attributes for use in calculating inter-cluster distance in conjunction with the second embodiment of the present invention.

FIG. 17 illustratively depicts two of these probability density functions for attribute j for two different segments Ci and $C_h$ as corresponding functions $C_{i,j}$ and $C_{h,j}$ also represented as functions 1710 and 1720, respectively. The mean of each function ($\mu_i$ and $\mu_h$, respectively) is shown along with a location one standard deviation, $\sigma$, on either side of each mean. The integrated areas under the Gaussian functions for each of the values $p_{11}$, $p_{12}$, $p_{21}$ and $p_{22}$ are respectively shown as areas 1713, 1717, 1723 and 1727 in FIG. 17.

If attribute j is modeled by a Multinomial distribution, let $s_j$ be the number of possible states for attribute j:

$$d_j(C_{i,j}, C_{h,j}) = KL(p(x_j = NULL | C_i), p(x_j = NULL | C_h)) + \quad (16) \\ \sum_{v=1}^{s_j} KL(p(x_j = v | C_i), p(x_j = v | C_h))$$

b. Merge the nearest pair of segments to produce a parent node.

c. Compute the distance from the parent node to the other nodes in the tree.

Let left denote the left child of the parent node and right denote the right child of the parent node. The distance from the parent node to the cluster represented by node c in the tree is given by Equation (17) as follows:

$$d_{Clust}(Parent, c) = \frac{w(left) * d_{Clust}(left, c) + w(right) * d_{Clust}(right, c)}{w(left) + w(right)} \quad (17)$$

Here, w(left) and w(right) are a number of data points represented by the left and right child nodes, respectively.

d. Continue HAC until a root node representing the entire data population (dataset) is generated. If the resulting tree has depth$\le$t, then stop. Otherwise, proceed to step 2 below.

2. Remove internal nodes of the tree so that resulting tree has depth$\le$t and the leaf nodes correspond to segments.

a. Let node i denote a leaf in the tree that has depth>t.

b. For each internal node j on a path from the root to i, compute a score for node j as a minimum distance between a pair of children of j.

c. Set jMax to be node j on the path from the root to leaf node i with maximum score.

d. Make the child nodes of jMax be the child node of the parent of jMax.

e. Update the distance through Equation (18), as follows, among the parent node of jMax and its siblings. Let u be a sibling node of parent (jMax).

$$d_{Clust}(parent(jMax), u) = \frac{\sum_{j \in child(jMax)} w(j) * d_{Clust}(j, u)}{\sum_{j \in child(jMax)} w(j)} \quad (18)$$

f. Remove node jMax decreasing the depth of the path from root to leaf node i by 1.

g. Repeat steps a-f immediately above until the tree has a desired depth.

B. Segment Set Summary and Segment Set Comparison

The segment set summary operation identifies attribute-value pairs which characterize the records belonging to a set of segments. Note that a set of segments can be viewed as collectively a single segment derived from the records that would belong to the individual segments that form the set.

The segment set comparison operation compares two sets of segments and identifies attribute-value pairs which differentiate between the records belonging to each of the different sets of segments.

1. Segment Set Summary

Let S be a set of segments. The value of a given event (a given attribute/value pair) is computed with respect to the segments in set S. If segment set S contains one segment, then that set contains a single leaf node; alternatively, if this set contains an internal node in the tree, then this node may have been formed as the union of several segments. A general formula for assigning a value for scoring a given event=attribute/value pair begins by computing a probability of the event occurring in the segments in set S and the probability of the event occurring in the segments that are not in set S, as given by Equations (19) and (20) as follows:

$$ProbInS(Event) = \frac{\sum_{C \in S} w(C) * probevent(C)}{\sum_{C \in S} w(C)} \quad (19)$$

-continued $$ProbNotInS(Event) = \frac{\sum_{C \in S} w(C) * probevent(C)}{\sum_{C \in S} w(C)} \quad (20)$$

Here, w(C) denotes the number of records belonging to segment C.

For Event=[$Attr_j$=v] for a discrete-valued attribute j, the value of probevent(C) is simply p([$Attr_j$=v]|C). This is also true for binary, binomial and multinomial valued attributes inasmuch as all of these types of attributes have discrete values.

However, for continuous-valued attributes j, the following events are considered:
  i. $x_j \neq$ NULL and $x_j \in [-\infty, \text{lbng}]$
  ii. $x_j \neq$ NULL and $x_j \in [\text{lband}, \text{ubndp}]$
  iii. $x_j \neq$ NULL nd $x_j \in [\text{ubnd}, \infty]$
  where: lbnd and ubnd represent a lower bound and an upper bound, respectively.

Here, lbnd=max({min of $x_j$, $\mu^c_j - \sigma^c_j$}), ubnd =min({max of $x_j$, $\mu^c_j \sigma^c_j$}). Here $\mu^c_j$ is the mean of attributte j over the records in segment C; $\sigma^c_j$ is the standard deviation of attribute j over the records in segment C.

For the events listed above, the corresponding value for the probability, probevent(C), is computed as follows using a corresponding one of Equations (21)-(23) given the specified range of the attribute value for each event:

$$p(x_j \neq NULL \mid C)\left[\int_{-\infty}^{(lbnd-\mu^c_j)/\sigma^c_j} G(t; 0, 1) dt\right] \quad (21)$$

$$p(x_j \neq NULL \mid C)\left[\int_{(lbnd-\mu^c_j)/\sigma^c_j}^{(ubnd-\mu^c_j)/\sigma^c_j} G(t; 0, 1) dt\right] \quad (22)$$

$$p(x_j \neq NULL \mid C)\left[\int_{(ubnd-\mu^c_j)/\sigma^c_j}^{\infty} G(t; 0, 1) dt\right] \quad (23)$$

The score for a given event (attribute/value pair), i.e., Score(Event), is given by Equation (24) as follows:

Score (Event)=SScore(ProbInS(Event),ProbNotInS (Event))  (24)

The function SScore, as given by Equation (25) below, takes two numbers $0 \leq p2 < p1 \leq 1$ such that p1/p2 is likely to be less than 10 and returns a value in the range [0,1] that would increase with p1 and decrease with p2.

SScore(p1, p2))=$1-e^{(-0.05(p1/p2)-1)}$  (25)

If ProbInS (Event)<ProbNotInS(Event), then SScore is not used and the Event is not presented to the user as a summary event.

Only those events with the highest Score(Event) are shown to the user as events, as having characteristics, which most accurately summarize the records in a given set (S) of segments.

2. Segment Set Comparison

The segment set comparison operation is similar to the segment set summary operation.

Let S1 be the first set of segments and S2 be the second set of segments. The goal of segment set comparison is to identify events which discriminate between the records of Si and the records of S2.

The general formula for scoring a given event =attribute/value pair begins by computing the probability of the event occurring in the segments in set S1 and the probability of the event occurring in the segments in set S2, as given by Equations (26) and (27) as follows:

$$ProbInS1(Event) = \frac{\sum_{C \in S1} w(C) * probevent(C)}{\sum_{C \in S1} w(C)} \quad (26)$$

$$ProbInS2(Event) = \frac{\sum_{C \in S2} w(C) * probevent(C)}{\sum_{C \in S2} w(C)} \quad (27)$$

Here, w(C) denotes the number of records belonging to segment C.

For Event=[$Attr_j$=v] for a discrete-valued attribute j, the value of probevent(C) is simply p([$Attr_j$=v]|C).

For continuous-valued attributes j, the procedure differs from that given above for the segment set summary operation. The procedure to use is as follows.

First, let $\mu^{s1}_j$, $\sigma^{s1}_j$ be the mean and standard deviation, respectively, of continuous-attribute j over the records in S1. Let $\mu^{s2}_j$, $\sigma^{s2}_j$ be the mean and standard deviation, respectively, of continuous-attribute j over the records in S2.

Second, determine the values of $x_j$ where the height of the Gaussian modeling $x_j$ in S1 is equal to the height of the Gaussian modeling $x_j$ in S2 by solving the following quadratic equation: $At^2+Bt+C=0$, where, through the following Equations (28)-(30):

$$A = \left(\frac{1}{\sigma_j^{S1}} + \frac{1}{\sigma_j^{S2}}\right) \quad (28)$$

$$B = -2\frac{\mu_j^{S1}}{\sigma_j^{S1}} + 2\frac{\mu_j^{S2}}{\sigma_j^{S2}} \quad (29)$$

$$C = \left(\frac{\mu_j^{S1}}{\sigma_j^{S1}}\right)^2 - \left(\frac{\mu_j^{S2}}{\sigma_j^{S2}}\right)^2 + 2\log\left(\frac{\sigma_j^{S1}}{\sigma_j^{S2}}\right) \quad (30)$$

The solution(s) is given by Equations (31) and (32) as follows:

$$t1 = \left[-B + \sqrt{\frac{(B^2 - 4AC)}{2A}}\right] \quad (31)$$

$$t2 = \left[-B - \sqrt{\frac{(B^2 - 4AC)}{2A}}\right] \quad (32)$$

Set tMax=max(t1,t2) and tMin=min(t1,t2).

Then, the events corresponding to continuous-valued attributes are:
  i. $x_j \neq$ NULL and $x_j \in [-\infty, \text{tMin}]$
  ii. $x_j \neq$ NULL and $x_j \in [\text{tMin}, \text{tMax}]$
  iii. $x_j \neq$ NULL and $x_j \in [\text{tMax}, \infty]$ For the events listed above, the corresponding value for probevent (C) is given by one of the following Equations (33)-(35), again based on the specified range of its attribute value:

$$p(x_j \neq NULL \mid C) \left[ \int_{-\infty}^{(tMin-\mu_j^c)/\sigma_j^c} G(t; 0, 1) dt \right] \quad (33)$$

$$p(x_j \neq NULL \mid C) \left[ \int_{(tMin-\mu_j^c)/\sigma_j^c}^{(tMax-\mu_j^c)/\sigma_j^c} G(t; 0, 1) dt \right] \quad (34)$$

$$p(x_j \neq NULL \mid C) \left[ \int_{(tMax-\mu_j^c)/\sigma_j^c}^{\infty} G(t; 0, 1) dt \right] \quad (35)$$

The score for a given event (attribute/value pair) is then computed according to either Equation (36) or (37) as follows:

If ProbInS1(Event)>ProbInS2(Event), then Score
(Event)=SScore(ProbInS1(Event),ProbInS2
(Event)) (36)

If ProbInS2(Event)>ProbInSl(Event), then Score
(Event)=−SScore(ProbInS2(Event),ProbInS1
(Event)) (37)

Those attributes, such as one, two or other predefined number of attributes, with most positive Score(Event) values (indicated by left-directed bars, e.g., bar $1880_1$, in column 1880 in FIG. 18) are presented to the user with an interpretation that if an attribute has Event, then that attribute is more likely to be in (i.e., exhibited by) segment set S1 than segment set S2. Those attributes, again one, two or more, exhibiting the most negative Score (Event) are presented to the user with an interpretation (indicated by right-directed bars, e.g., bar $1890_1$, in column 1890 in FIG. 18) that if the attribute has Event, then that attribute is more likely to be in (i.e., exhibited by) segment set S2 rather than segment set S1.

We now present an alternate scoring technique that is discriminative based. As noted above, this technique statistically balances two aspects: (1) a degree of correlation between two variables, namely, (a) a binary variable corresponding to cluster membership and (b) a binary variable corresponding to whether an observable variable takes on a particular value or not; and (2) an amount of evidence (i.e., the number of records) supporting that correlation. The underlying mathematical steps for implementing this scoring technique are as follows.

This technique computes a discriminative score for cluster (group) c1 versus cluster (group) c2 given observation X=x, where c1 and c2 are mutually exclusive.

First, form variable X': X=x versus X'=not x; and form variable C': CÁ versus CÂ.

Next, get actual event occurrence counts for a 2×2 contingency table for variables X' and C'. Assume that these counts are a, b, c, d in left to right, top to bottom order. With this, the question then becomes are these variables dependent or not on each other?

To assess this dependency, let:

$$S' = \log \frac{\left( \prod (a+1) \prod (b+1) \prod (c+1) \prod (d+1) \right. }{ \left( \prod (a+b+2) \prod (c+d+2) \prod (a+c+2) \right. } \quad (38)$$
$$\frac{\left. \prod (a+b+c=d+4) \right)}{\left. \prod (b+d+2) \prod (4) \right)}$$

If S' is less than zero, then X' and C' are likely to be independent of each other. Hence, X' should not be shown on bar chart in columns 1880 or 1890 in FIG. 18. Alternatively, if the value of S' is greater than zero, then a magnitude of the discriminative score is the value S'.

A direction of the score is separately determined, that is, does X=x make c1 or c2 more likely?

The resulting scores for the displayed events then need to be normalized. The scores could be normalized for a given c1/c2 comparison as follows: find the X' that has the highest magnitude and re-normalize all scores so that this highest magnitude is one. Unfortunately, with this re-normalization, a top magnitude for any comparison will always be one. As such, global normalization would be preferred. Since it is not efficient to try all combinations of c1 versus c2, one can find the largest magnitude among the comparisons ci versus not ci for every atomic cluster ci, and then use this magnitude for normalization across all possible comparisons. Occasionally, a magnitude value may exceed one, in which case that magnitude should be clipped to one.

Although various embodiments which incorporate the teachings of the present invention have been shown and described in considerable detail herein, those skilled in the art can readily devise many other embodiments that still utilize these teachings.

We claim:

1. A computer-implemented system for automatically categorizing unknown incoming data and a category visualization (CV) system that displays a graphic representation of each category as a hierarchical map, comprising:
   a node corresponding to each base category;
   nodes corresponding to combinations of similar categories;
   a leaf node corresponding to a base category, the leaf node is positioned as a cluster of nodes at a lowest level of the hierarchy wherein combinations of similar categories are positioned on top of the leaf node, forming successively higher levels of the hierarchy;
   a root node corresponding to a category that contains all records in a collection, the root node forms top of the hierarchy;
   a non-leaf node corresponding to each combined category, wherein similar base categories are combined into a combined category;
   wherein each non-leaf node has two arcs that connect the non-leaf node to two nodes corresponding to subcategories of the combined category; and
   wherein if a node is selected, the system displays additional information about corresponding category, the additional information is at least one of number of records in the category or characteristic attributes of the category, and
   wherein if an arc is selected, the system displays information relating to categories connected by the arc, such as similarity value for the connected categories.

2. The system of claim 1, wherein the base category is a category identified by a categorization process (classification and clustering).

3. The system of claim 1, wherein the combined category is assigned the records of two or more base categories.

4. The system of claim 1, wherein the additional information further comprises characteristic and discriminating information such as attribute-value discrimination, attribute-value discrimination refers to how well the value of an attribute distinguishes the records of one category from the records of another category.

5. The system of claim 4, wherein the attribute-value discrimination is determined by employing the following equation:

$$discrim(x_i \mid G_1, G_2) = (p(x_i \mid G_1) - p(x_i \mid G_2))\log\frac{p(x_i \mid G_1)}{p(x_i \mid G_2)} +$$

$$(p(x_i \mid G_2) - p(x_i \mid G_1))\log\frac{1 - p(x_i \mid G_1)}{1 - p(x_i \mid G_2)}$$

where discrim($x_i$|$G_1$,$G_2$) is the measurement of how well the value of an attribute distinguishes the records of one combined category from the records of another combined category, $G_1$ is the first combined category, $G_2$ is the second combined category, $x_i$ is the records in one of the combined categories, p($x_i$|$G_1$) is the probability that a record containing specific attributes is in combined category $G_1$, and p($x_i$|$G_2$) is the probability that a record containing specific attributes is in combined category G$x_1$|$G_1$.

6. The system of claim 1, wherein similarity value refers to a rating of the differences between attribute values of records in one category and attribute values of records in another category, a high value for similarity indicates that there is little difference between the records in the two categories.

7. The system of claim 6, wherein the similarity value for a pair of base categories is determined by employing the following equation:

$$dist(h_1, h_2) = \sum_{x_1,\ldots x_m}(p(x_1,\ldots,x_m \mid h_1) - p(x_1,\ldots,x_m))\log\frac{p(x_1,\ldots,x_m \mid h_1)}{p(x_1,\ldots,x_m \mid h_2)}$$

where dist($h_1$, $h_2$) is the distance and similarity between two categories, $X_1, \ldots, X_m$ is the attribute values, $h_1$, $h_2$ is a count of a total number of records in categories 1 and 2, p($x_1 X_m$|$h_1$) is a conditional probability that a record has attribute values $x_1, \ldots X_m$ given that it is a record from category 1, and p($x_1 X_m$|$h_2$) is a conditional probability that a record has attribute values $x_1, \ldots X_m$ given that it is a record from category 2.

8. The system of claim 6, wherein the similarity for a pair of base categories is determined by employing the following equation:

$$dist(h_1, h_2) = \sum_i \sum_{x_i}(p(x_i \mid h_1) - p(x_i \mid h_2))\log\frac{p(x_i \mid h_1)}{p(x_i \mid h_2)}$$

where dist($h_1$,$h_2$) is the distance and similarity between two categories, $x_i$ is the attribute values, $h_1$,$h_2$ is a count of a total number of records in categories 1 and 2, $x_i$|$h_1$) is a conditional probability that a record has attribute values $x_i$ given that it is a record from category 1, and $x_i$|$h_2$) is a conditional probability that a record has attribute values x1 given that it is a record from category 2.

9. The system of claim 6, wherein the similarity for two combined categories is determined by employing the following equation:

$$dist(G_1, G_2) = \sum_{h_j \in G_1, h_k \in G_2}(p(h_j)p(h_k)dist(h_j)p(h_j, h_k)$$

where dist($G_1$,$G_2$) is the distance and similarity between two combined categories, $G_1$ is the first combined category, $G_2$ is the second combined category, $h_j$,$h_k$ is a count of a total number of records in combined categories 1 and 2, and p($h_j$)p($h_k$) is a probability that a record is in each of the combined categories.

10. The system of claim 6, wherein the similarity for two combined categories is determined by employing the following equation:

$$dist(G_1, G_2) = \min\{dist(h_j)(h_k) \mid h_j \in G_1, h_k \in G_2\}$$

where dist($G_1$,$G_2$) is the minimum distance between two combined categories, $G_1$ is the first combined category, $G_2$ is the second combined category, and $h_1$,$h_k$ is a count of a total number of records in combined categories 1 and 2.

11. The system of claim 6, wherein the similarity for two combined categories is determined by employing the following equation:

$$dist(G_1, G_2) = \max\{dist(h_j)(h_k) \mid h_j \in G_1, h_k \in G_2\}$$

where dist($G_1$,$G_2$) is the maximum distance between two combined categories, $G_1$ is the first combined category, $G_2$ is the second combined category, and $h_1$, $h_k$ is a count of a total number of records in combined categories 1 and 2.

12. The system of claim 1, wherein the graphic representation of each category is displayed as a decision tree, further comprising:

nodes that correspond to each attribute of the corresponding base categories; and arcs that correspond to values of that attribute;

wherein each node, except the root node, represents a setting of attribute values as indicated by arcs in a path from a first node to the root node.

13. The system of claim 12, wherein the selection of a node, results in display of a probability for each category that a record in the category will have attribute settings that are represented by the path.

14. A computer-readable storage medium containing a plurality of categorized data records and a computer-implemented method of calculating and displaying a graphic representation of various characteristics and discriminating information for each category, comprising:

providing nodes that represent each base category;

providing nodes that represent combined categories, wherein combinations of similar categories are grouped together to form the combined categories;

utilizing a leaf node to form the bottom of the graphic representation;

utilizing a root node to form the top of the graphic representation connecting nodes representing sub-categories of a combined category via arcs;

combining the two base categories that are the most similar into a combined category;

repeating process of combining similar categories until one combined category represents all records in a collection; and allowing a node to be selected, wherein the system displays additional information about corresponding category, the additional information is at least one of number of records in the category or characteristic attributes of the category, and allowing an arc to be selected, wherein the system displays information relating to categories connected by the arc, such as similarity value for the connected categories.

15. The system of claim 14, further comprising de-emphasizing specific nodes and focusing on specific non-de-emphasized nodes.

* * * * *